Feb. 1, 1966  J. L. BUIE  3,233,125
TRANSISTOR TECHNOLOGY
Filed April 23, 1963  7 Sheets-Sheet 1
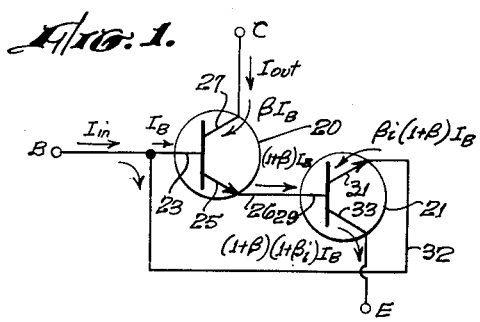
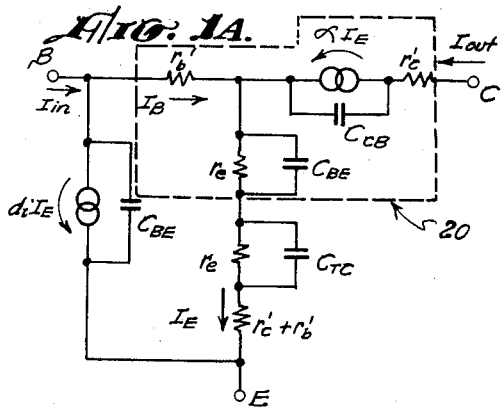
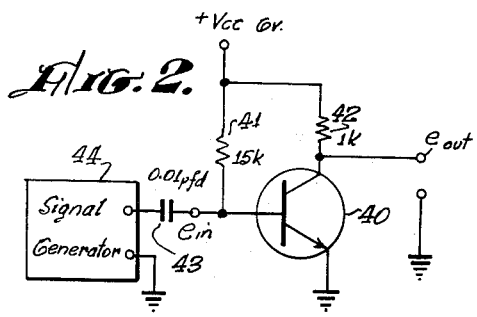
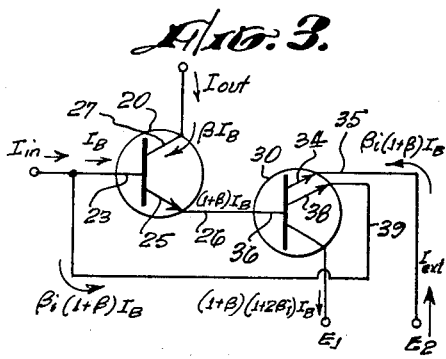
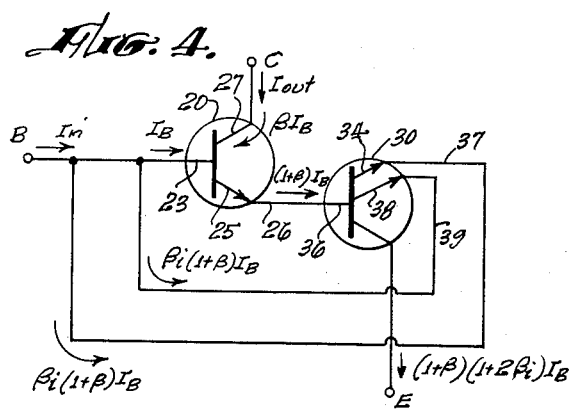
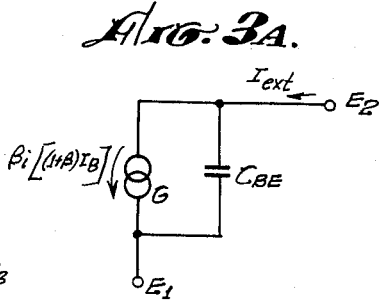
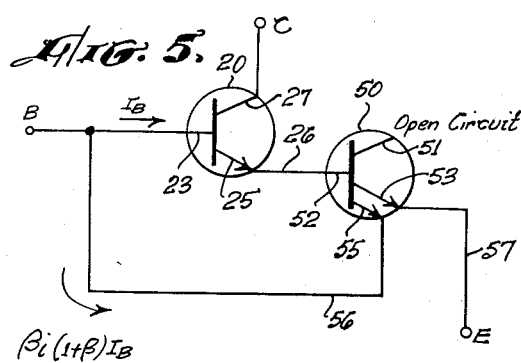
JAMES L. BUIE,
INVENTOR.
BY HIS ATTORNEYS
Spensley & Horn

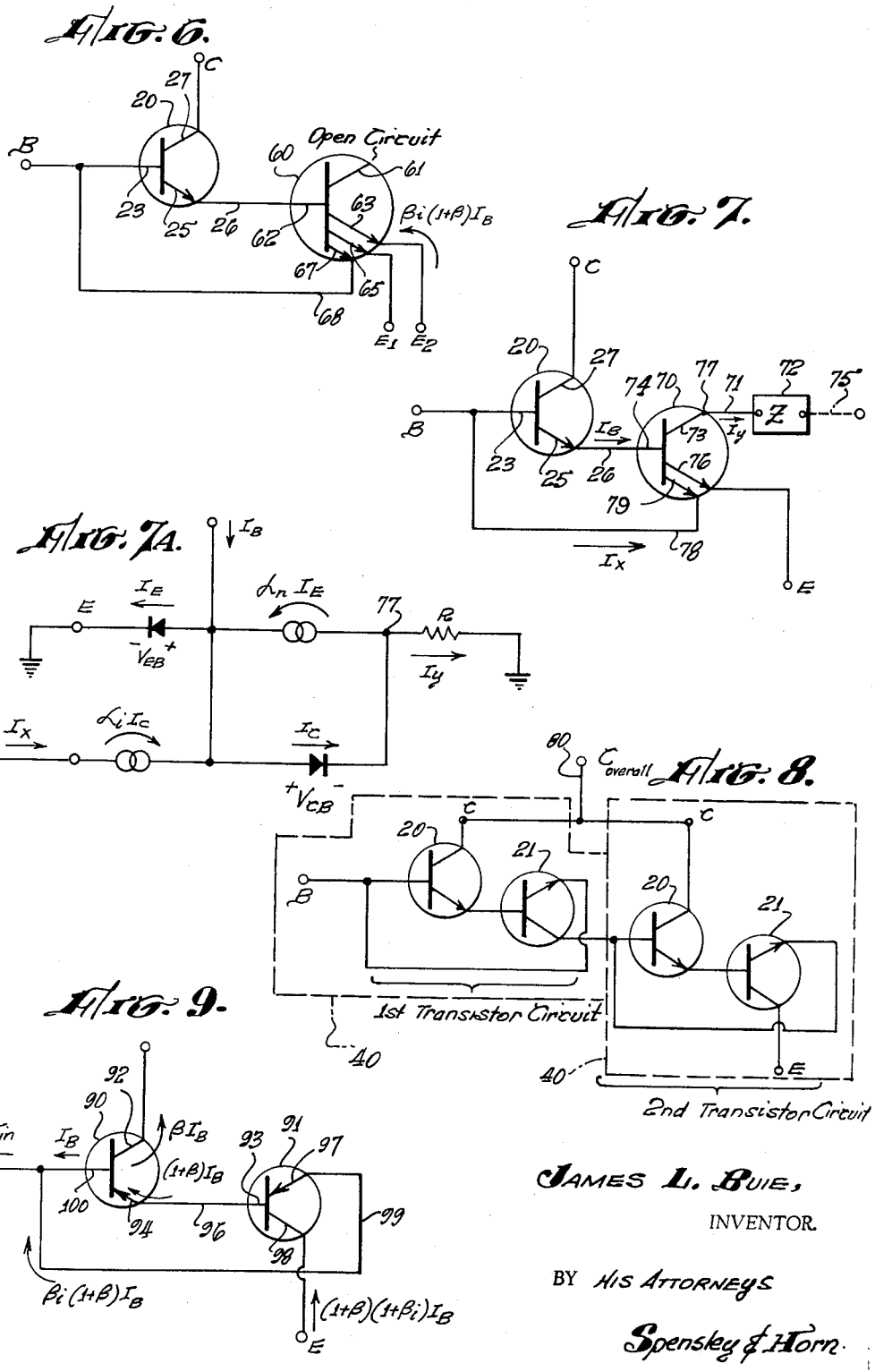

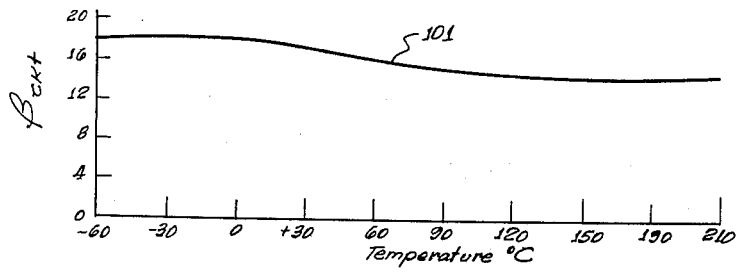
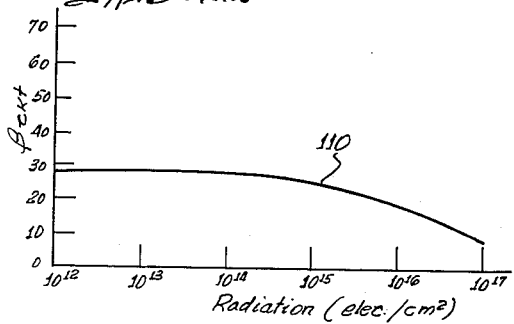
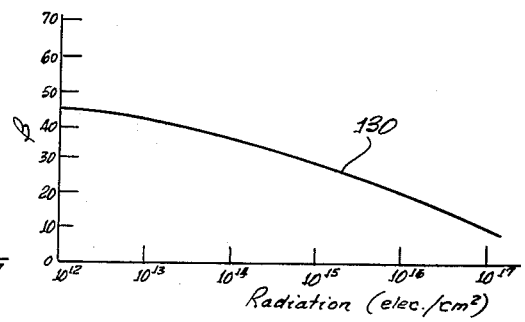
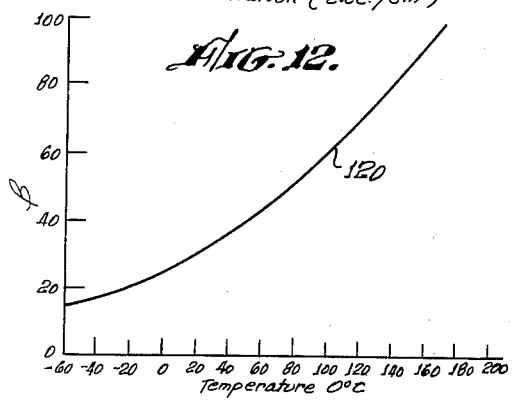
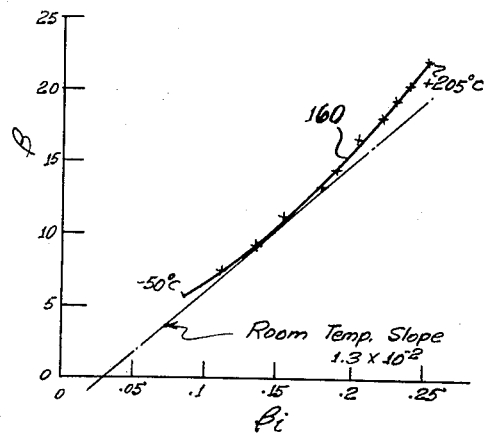
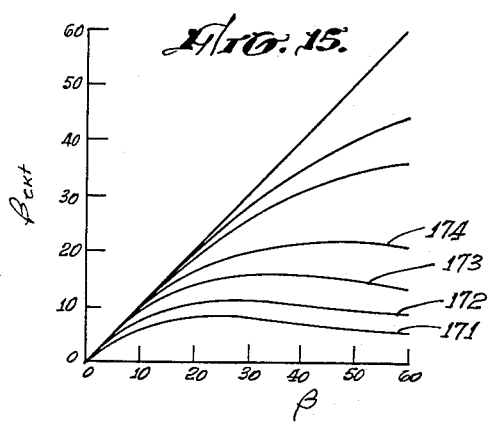
JAMES L. BUIE,
INVENTOR.
BY HIS ATTORNEYS
Spensley & Horn.

Feb. 1, 1966  J. L. BUIE  3,233,125
TRANSISTOR TECHNOLOGY
Filed April 23, 1963  7 Sheets-Sheet 4
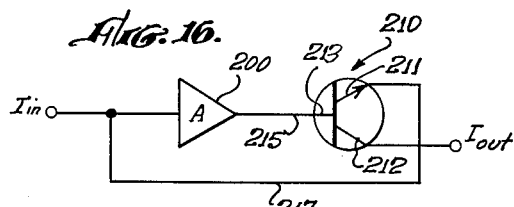
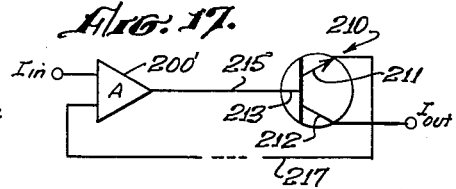
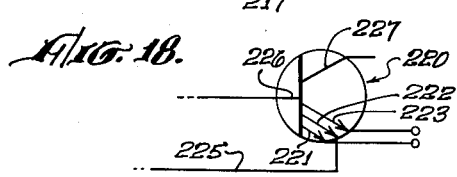
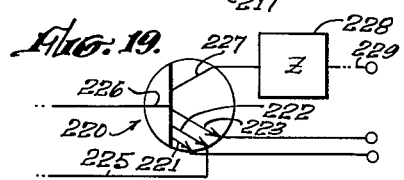
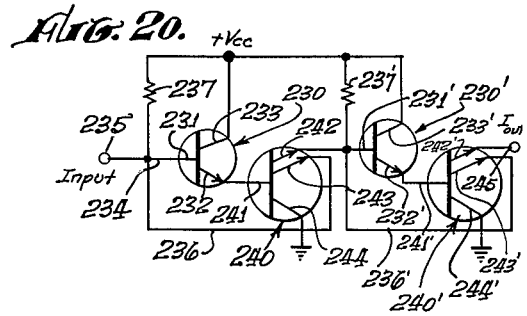
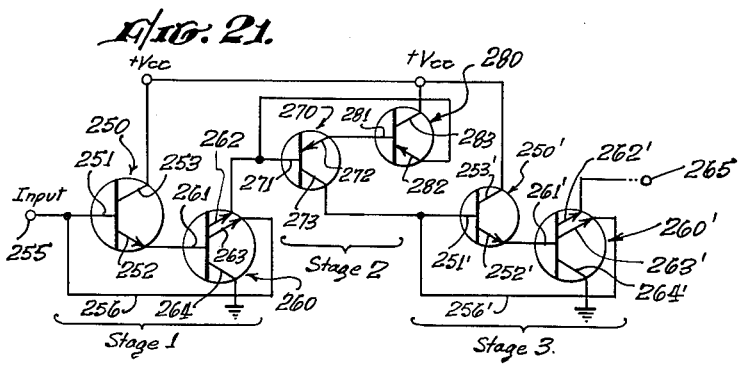
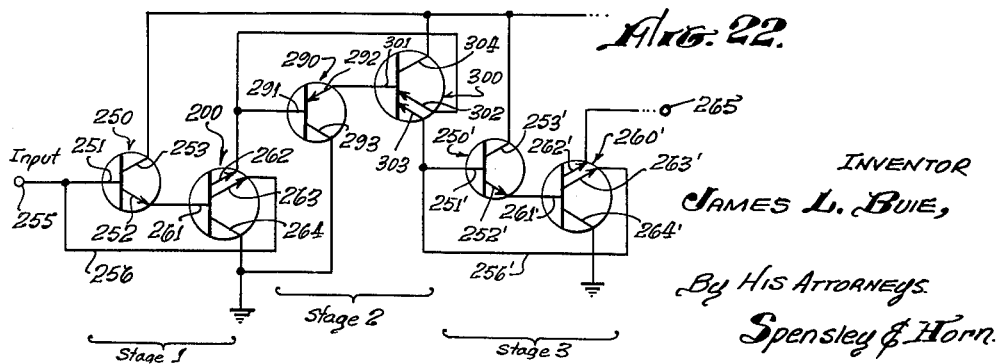
INVENTOR
JAMES L. BUIE,
By His Attorneys
Spensley & Horn.

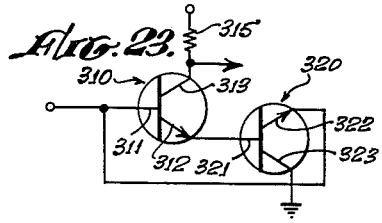
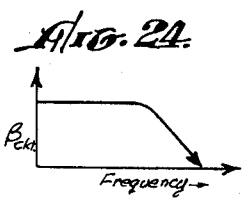
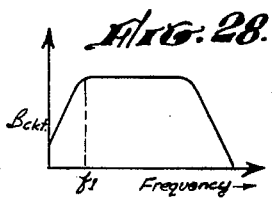
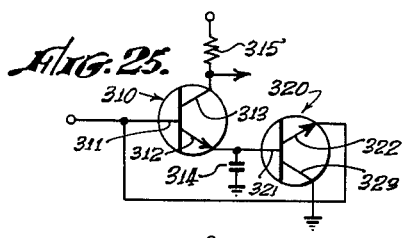
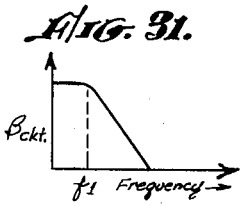
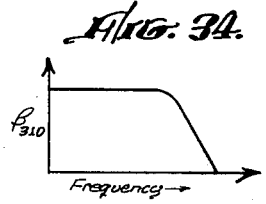
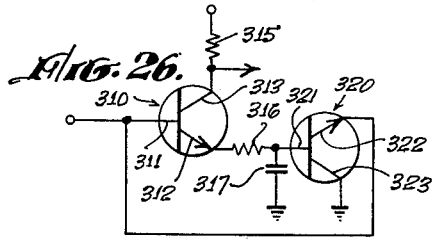
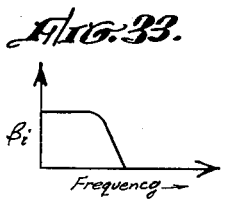
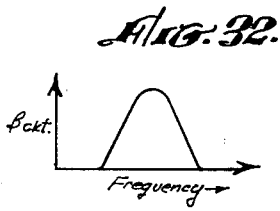
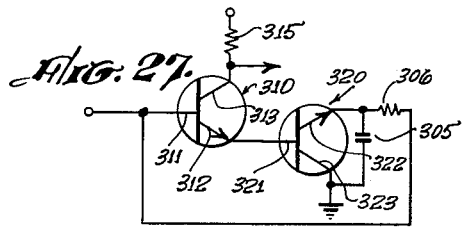
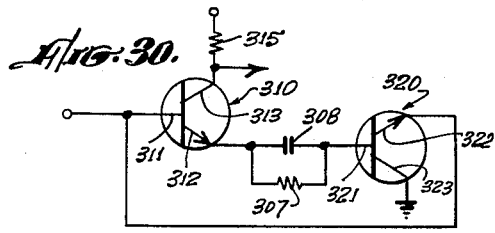
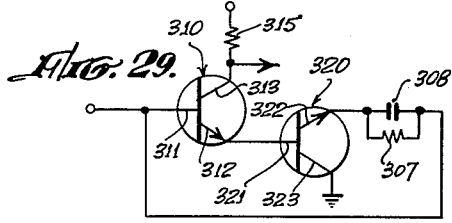
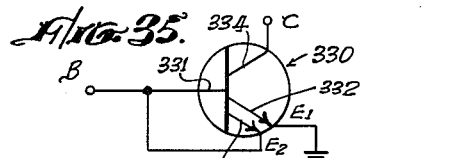
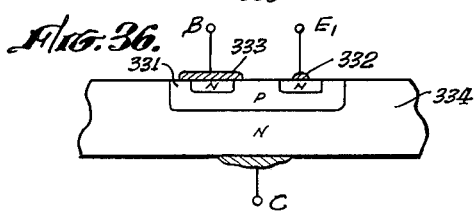

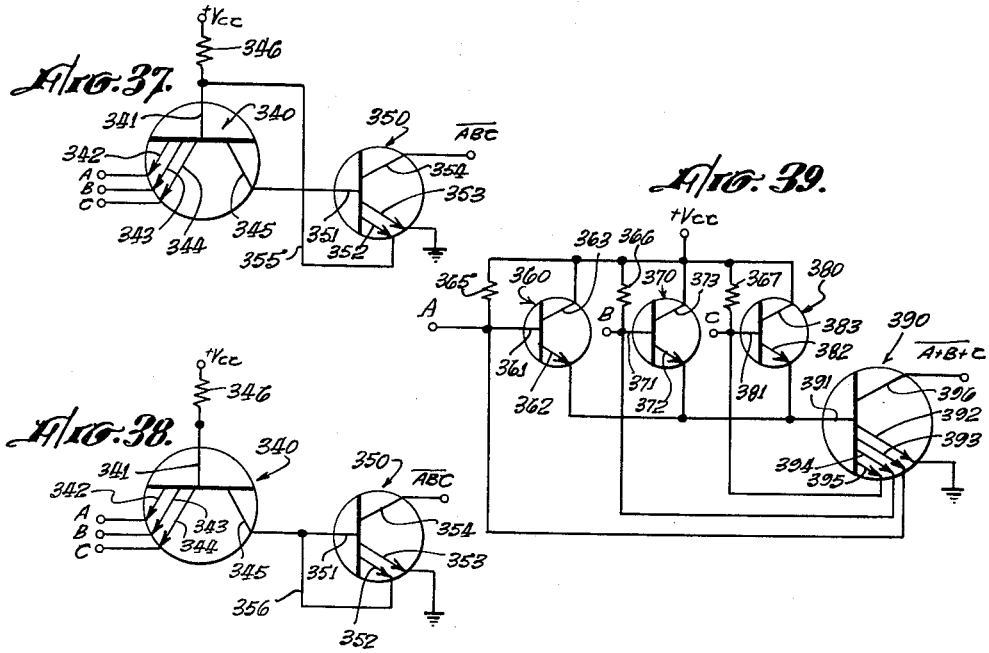
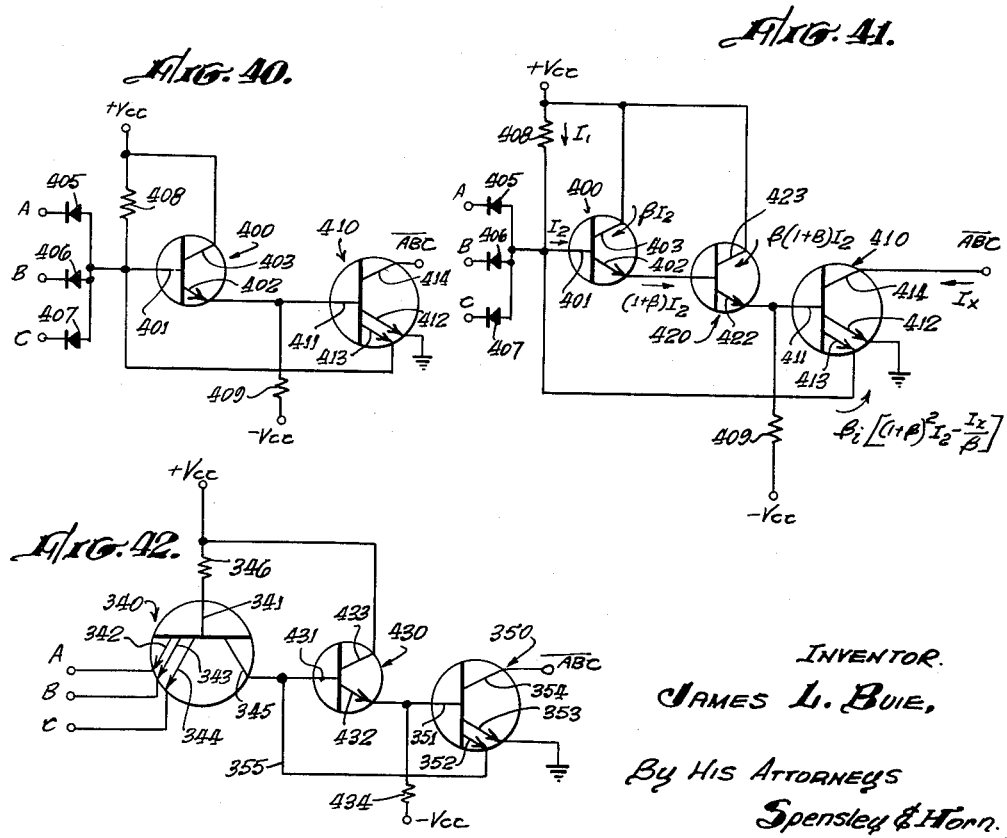
INVENTOR.
JAMES L. BUIE,
BY HIS ATTORNEYS
Spensley & Horn.

Feb. 1, 1966  J. L. BUIE  3,233,125
TRANSISTOR TECHNOLOGY
Filed April 23, 1963  7 Sheets-Sheet 7

INVENTOR.
JAMES L. BUIE,
By His Attorneys
Spensley & Horn.

3,233,125
TRANSISTOR TECHNOLOGY
James L. Buie, Panorama City, Calif., assignor to TRW Semiconductors, Inc., a corporation of Delaware
Filed Apr. 23, 1963, Ser. No. 275,799
36 Claims. (Cl. 307—88.5)

This application is a continuation-in-part of co-pending application Serial No. 250,060, filed January 8, 1963 in the name of James L. Buie, entitled "Transistor Technology."

This invention relates to transistors and more particularly to transistor circuits employing current feedback to accomplish various circuit innovations.

One group of circuits employing the present invention current feedback approach results in a circuit which is electrically equivalent to a single transistor, but which is relatively insensitive to substantial temperature changes and radiation level.

The coupling of two transistor stages may also advantageously employ the present invention transistor current feedback approach.

Various frequency-sensitive amplifier equivalent circuits may be simulated by the use of the present invention transistor current feedback circuit, such as high-pass and low-pass amplifiers.

Various and superior switching functions may also be achieved in accordance with the present invention circuit concepts.

It is well known that many electrical parameters of transistors are sensitive to radiation and temperature changes. Of special interest is the value of $\beta$ which may be defined as the ratio of the collector current to the base current. It is often desirable to have transistors capable of operation in a circuit over wide radiation and temperature ranges in which the $\beta$ of the transistor remains substantially constant.

Heretofore, efforts to accomplish this end have concerned themselves with altering the physical parameters of the transistors, such as the impurity concentrations of the physical structure of the transistors.

Another technique often employed to effect $\beta$ stability with substantial changes in temperature has been to provide an electrical network to maintain a constant operating point on the transistor output characteristic, such as by use of a voltage divider network. One disadvantage of such a technique is the fact that power is consumed and the degree of stabilization is limited. This technique also does not effectively serve to appreciably control the effective A.C. $\beta$ even though it does enhance the D.C. $\beta$ stabilization. These techniques have not been found to be wholly satisfactory as the results are not generally reproducible or consistent. These techniques have not resulted in sufficient $\beta$ insensitivity to temperature variations often countered in the environment in which the circuit may be required to operate.

It was therefore believed to be preferable to pursue an approach which did not inherently possess the above-mentioned limitations. Thus, a transistor circuit having three external electrodes comparable to the base, emitter and collector electrodes of an ordinary transistor was thought to offer the best solution if such a design could be achieved, the circuit thereby providing what may be termed a "composite" transistor.

The present invention concept in its broadest aspects lies principally in the discovery that a transistor can be arranged to feed back current to control a preceding stage to provide several advantages hereinafter to be discussed. The transistor whose current is fed back is in saturation.

The term "conductivity type," as herein applied to transistors, refers to their classification into one of two general catagories in accordance with their electrical conduction characteristics, i.e., PNP and NPN types. Thus, a PNP transistor is said to be of the opposite conductivity type than an NPN transistor, and vice versa.

Another aspect of the present invention concept is the provision of a transistor circuit which forms a composite transistor, the circuit having three terminals which are comparable to the base, emitter and collector electrodes of an ordinary transistor. The presently preferred embodiment resides primarily in a circuit design employing two transistors of the same conductivity type interconnected in such a manner as to provide a composite transistor which is relatively insensitive to substantial changes in temperature and radiation levels during operation. The two like conductivity type transistors may be either PNP or NPN transistors.

It is therefore a primary object of the present invention to provide an improved transistor current feedback circuit.

It is another object of the present invention to provide an equivalent to a present art transistor which is substantially insensitive to changes in temperature and radiation levels.

Another object of the present invention is to provide a transistor circuit network which behaves electrically as a single present art transistor in most respects, save that it is substantially insensitive to changes in temperature and radiation levels.

A further object of the present invention is to provide a transistor circuit network which behaves electrically as a single transistor in most respects except that the effective $\beta$ of this network is substantially insensitive to changes in temperature and radiation levels.

Yet another object of the present invention is to provide a transistor circuit network of the character described which is compatable with either linear or non-linear transistor circuits.

Yet a further object of the present invention is to provide a circuit of the character described which may be readily fabricated in accordance with present art transistor technology.

A still further object of the present invention is to provide a transistor circuit network which behaves electrically as a single transistor in most respects and wherein the effective current gain may be made dependent in a predetermined manner upon changes in radiation and/or temperature.

Yet a further object of the present invention is to provide a transistor circuit coupling arrangement in which a transistor is employed in a particular and novel manner as a coupler between current amplified stages.

The novel features which are believed to be characteristic of the present invention, together with further objects and advantages thereof, will be better understood from the following description taken in conjunction with the accompanying drawings in which the invention is illustrated by way of example. It is to be expressly understood, however, that this description is for the purpose of illustration and example only, and that the true spirit and scope of the invention is defined by the accompanying claims.

In the drawings:

FIGURE 1 is a schematic view of the presently preferred embodiment of this invention;

FIGURE 1A is the equivalent circuit of the transistor of FIGURE 1;

FIGURE 2 is a circuit diagram showing how the transistor network of FIGURE 1, viewed as a single transistor, may be operated as a transistor amplifier;

FIGURE 3 is a circuit diagram of an alternate embodiment of a transistor circuit in accordance with the present invention;

FIGURE 3A is the equivalent circuit for the transistor circuit of FIGURE 3;

FIGURES 4–7 are circuit diagrams of further alternate embodiments of transistor circuits in accordance with the present invention;

FIGURE 7A is the equivalent circuit for the transistor circuit of FIGURE 7;

FIGURES 8 and 9 are circuit diagrams of still further alternate embodiments of the present invention transistor circuit;

FIGURE 10 is a graph showing the relationship of the effective $\beta$ of the present invention transistor circuit as a function of temperature;

FIGURE 11 is a graph showing the relationship of the effective $\beta$ of the present invention transistor circuit as a function of radiation;

FIGURE 12 is a graph showing the relationship of the $\beta$ of the input transistor of the present invention circuit as related to temperature;

FIGURE 13 is a graph showing the relationship of the $\beta$ of the input transistor of the present invention circuit as related to radiation;

FIGURE 14 is a three-dimensional graph showing the relationship of the inverse $\beta$ of the output transistor to the normal $\beta$ of the input transistor of the present invention circuit as a function of temperature;

FIGURE 15 is a curve showing the relationship of $\beta$ of the input transistor to $\beta$ of the overall circuit for varying values under varying conditions;

FIGURE 16 is a circuit employing a transistor to provide constant current feedback to an amplifier;

FIGURE 17 is a circuit similar to that of FIGURE 16 in which the constant current feedback is employed together with a differential amplifier;

FIGURE 18 is a partial circuit diagram showing how a multiple-emitter transistor may be used in a current feedback circuit in accordance with the present invention concepts;

FIGURE 19 is an alternative arrangement of the circuit of FIGURE 18;

FIGURE 20 is a circuit diagram showing how two composite current-feedback amplifiers may be coupled;

FIGURE 21 is a circuit diagram showing how two composite transistor amplifiers, such as shown in FIGURE 4, may be coupled by an intermediate composite transistor in accordance with the present invention, employing current feedback;

FIGURE 22 is an alternate embodiment of the circuit of FIGURE 21;

FIGURE 23 is a circuit diagram showing how the present invention transistor feedback concept may be employed to produce an all-pass amplifier;

FIGURE 24 is a graph showing the relationship between the gain of the circuit of FIGURE 23 as a function of the frequency;

FIGURES 25–27 are circuit diagrams of three alternate high-pass amplifiers in accordance with the present invention;

FIGURE 28 is a graph showing a representative relationship of the gain of the circuits of FIGURES 25–27 as a function of frequency;

FIGURES 29 and 30 are circuit diagrams of low-pass amplifiers in accordance with the present invention;

FIGURE 31 is a graph showing a representative relationship of gain as a function of frequency for the circuits of FIGURES 29 and 30;

FIGURE 32 is a graph showing a representative relationship of gain as a function of frequency for a circuit, such as shown in FIGURE 23, in which the individual transistor characteristics are so chosen as to produce a bandpass amplifier;

FIGURE 33 is a graph showing the dependence of $\beta_1$ upon frequency of the first transistor of the FIGURE 23 circuit when operated as a bandpass amplifier;

FIGURE 34 is a graph showing the dependence of $\beta_1$ upon frequency of the second transistor of the FIGURE 23 circuit when operated as a bandpass amplifier;

FIGURE 35 is a circuit diagram showing how a multiple-emitter transistor in accordance with the present invention may be used in the anti-saturation mode;

FIGURE 36 is a sectional view showing a preferred construction for achieving the circuit of FIGURE 35;

FIGURES 37 and 38 are circuit diagrams of NAND circuits in accordance with the present invention;

FIGURE 39 is a circuit diagram of another NAND circuit in accordance with the present invention;

FIGURE 40 is a circuit diagram of a low-level NAND gate in accordance with the present invention; and FIGURES 41 through 45 are circuit diagrams of alternate high-level NAND gates in accordance with the present invention.

Figure 43:
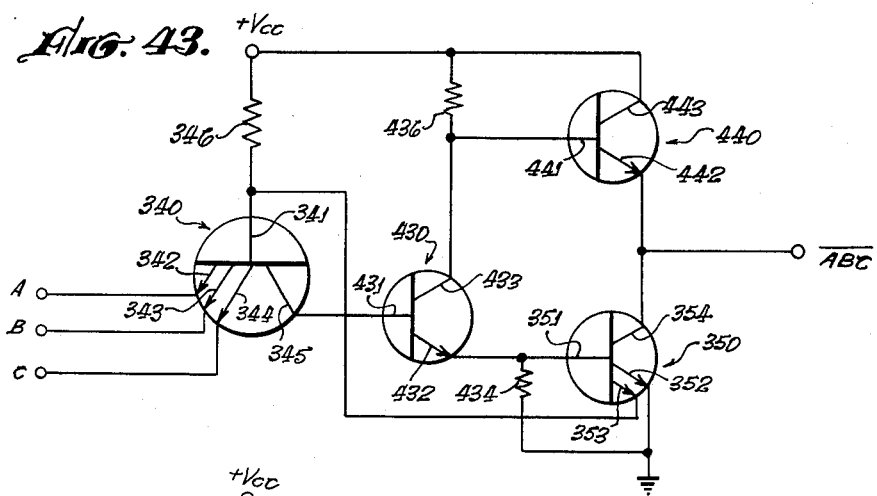

Referring now to the drawings, there is shown in FIGURE 1 two transistors 20 and 21. Transistor 20 will be designated as the input transistor and it includes a base electrode 23, an emitter electrode 25 and a collector electrode 27. The transistor 21 is designated as an output transistor and it also includes a base electrode 29, an emitter electrode 31 and a collector electrode 33. The emitter electrode 25 of the input transistor is connected by lead 26 to the base electrode 29 of the output transistor. Further, the emitter electrode 31 of the output transistor 21 is connected by lead 32 to the base electrode 23 of the input transistor. Viewing the overall transistor circuit as consisting of both transistors 29 and 21, including their interconnecting leads, as shown and described, the overall terminals are designated as B, C and E, respectively. Viewing this combination of both transistors as a single transistor, it may be operated as if the respective terminals B, C and E are the "overall" base, collector and emitter electrodes of a single transistor.

The circuit of FIGURE 1 will now be described as to its operation, with major emphasis being placed upon the current gain or $\beta$ of the overall circuit. Transistor 20 may be viewed as the primary operative element in the circuit and is termed the input transistor. It is this transistor whose $\beta$ is to be controlled in such a manner by coaction with the second or output transistor 21 so that the effective overall circuit $\beta$ will be rendered relatively insensitive to changes in temperature and radiation levels. The output transistor 21 acts primarily as a negative feedback element to effectively control the $\beta$ of the input transistor and hence the overall $\beta$ of the entire circuit viewed as a single transistor with the three overall terminals B, C and E functioning as the effective base, collector and emitter electrodes of the entire circuit.

The various current values and the direction of flow are indicated in FIGURE 1. Both of the transistors are of the NPN type. They may be of the same electrical characteristics or they may be of differing characteristics. In the example about to be described, both transistors are 2N708 types. Any transistor type presently available with the exception of point contact devices, may be satisfactorily employed, i.e., any type of junction transistor may be utilized.

The FIGURE 1 circuit may be operated as a transistor amplifier as shown in FIGURE 2 wherein the overall transistor equivalent to the FIGURE 1 network is shown schematically as a single transistor 40. Before discussing the FIGURE 2 circuit, the circuit of FIGURE 1 will be analyzed.

The overall input current I flowing into the Base B is equal to the sum of the two currents flowing into the base electrode 23 of transistor 20 and into the emitter electrode 31 of transistor 21. It may be shown that:

$$I_{in} = I_B + \beta_i(1+\beta)I_B$$

$$\beta \text{ circuit} = \frac{I_{out}}{I_{in}} = \frac{\beta}{1+\beta_i+\beta_i\beta}$$

$$\beta \text{ circuit} = \frac{1}{\frac{1}{\beta}+\frac{\beta_i}{\beta}+\beta_i} = \frac{1}{\frac{1}{\beta}+k+k\beta}$$

where $$k = \frac{\beta_i}{\beta}$$

$\beta$=the $\beta$ of the input transistor (the current gain ratio of the collector current to the base current of the input transistor)
$\beta_i$=the current gain ratio of the emitter current (where operated as a collector) to the base current of the output transistor.
$I_{in}$=input current to overall circuit.
$I_{out}$=output current of overall circuit (collector of the input transistor)=$\beta I_B$
$I_B$=base current of input transistor.
$(1+\beta)I_B$=emitter current of the input transistor and the base current of the output transistor.
$\beta_i(1+\beta)I_B$=emitter current of the output transistor.
$(1+\beta)(1+\beta_i)I_B$=emitter current of overall circuit
$(1+\beta)(1+\beta_i)I_B$=collector current of output transistor.

For the above conditions to obtain, it is assumed that:

(1) $k$ remains substantially constant over a relatively large temperature range.

(2) $\beta$ is large compared to unity; it is typically from 20 to 60, but may be as low as 5 and as high as several hundred.

(3) $\beta_i$ is small compared to unity; typically from 0.01 to 0.1.

Regarding assumption 1 above, reference is now made to FIGURE 14 wherein $\beta$ as the ordinate is plotted against $\beta_i$ as the abscissa over a variation in temperature ranging from $-50°$ C. to $+205°$ C.

The curve shown in FIGURE 14 was plotted for a composite transistor circuit, such as shown in FIGURE 2. For the value of $k$ to be an absolute constant, the curve 160 should be a straight line. The experimental data represented by this curve 160 shows it to very nearly approach a straight line having an average value of $k$ of approximately $1.3 \times 10^{-2}$.

In fact, the departure from linearity in the manner shown in FIGURE 14 is beneficial in cases where a more constant circuit with temperature variation is desired. In connection with the control of the overall circuit, it was previously pointed out that the ratio of $\beta$ to $\beta_i$ should remain substantially constant with increasing temperature. The curve 160 of FIGURE 14 actually shows the curve to be crescent-shaped and this shape, with the curve toward the left of the straight line, actually serves the end of maintaining of the circuit better than if it were indeed completely straight.

In FIGURE 15, there is shown a plot of the $\beta_{ckt.}$ as the ordinates and $\beta$ as the abscissa for a circuit such as shown in FIGURE 2 for varying values of $k$. It is apparent from an examination of the family of curves in FIGURE 15 that if it is desired to operate the overall circuit in such a manner that $\beta_{ckt.}$ remains substantially constant (over a reasonably large portion of the curve) that only those values of $k$ between approximately $5 \times 10^{-3}$ to $5 \times 10^{-4}$ (albeit constant values of $k$) be chosen for a particular set of input and output transistors such as used to plot this curve. It will be, of course, appreciated that the family of curves shown in this FIGURE 15 is for a given set of transistors. They may be made to vary considerably by judicious choice of the transistors employed. Thus, for example, while in this graph the overall circuit $\beta,\beta_{ckt.}$ ranges for curves 171, 172, 173 and 174 from approximately 4 to 22, that higher or lower values may be achieved as desired. The values of $k$ for the curves 171, 172, 173 and 174, shown in FIGURE 15, are respectively, $5 \times 10^{-3}$, $2 \times 10^{-3}$, $10^{-3}$ and $5 \times 10^{-4}$.

In FIGURE 1A there is shown the equivalent circuit to the circuit of FIGURE 1. Terminals B, C and E are equivalent to those similarly labeled terminals in FIGURE 1. The dotted box labeled 20 in FIGURE 1A is the equivalent circuit of the input transistor of FIGURE 1; the remaining portion of FIGURE 1A being representative of the output transistor 21. The principal values of the transistor parameters are shown in the drawing to indicate the various current flow directions, the current paths and the effective internal resistances and capacitances when the circuit of FIGURE 1 is operated as an amplifier where:

$\alpha_i$=the current gain ratio of the collector current of the output transistor 21 to the emitter current of the same transistor when the output transistor is operated as shown in FIGURE 1 with inverse connections to the emitter and collector electrodes.
$C_{BE}$=the base to emitter capacitance of output transistor 21.
$r_b'$=the effective base resistance in either the base 25 of the input transistor 20 on the base electrode 29 of transistor 21.
$r_e$=the diffusion resistance (of minority carriers in the base region) of one or the other transistor. The value of $r_e$ is given by the formula $$r_e = \frac{KT}{qI_E}$$

$K$=Boltzman's constant
$T$=the temperature in degrees Kelvin
$q$=the charge on an electron
$I_E$=the current flowing then the emitter electrode of transistor 21 is forward biased relative to its base electrode.
$C_{TC}$=the capacitance of the collector-base junction where such junction is forward biased.
$r_c'$=the effective parasitic resistance of the collector electrode of either the output transistor 21 or the input transistor 20.
$\alpha$=the current gain ratio of the collector current to the emitter current of the input transistor 20.
$C_{CB}$=the collector-base capacitance of the input transistor 20.
$I_B$=the base current of the input transistor 20.
$I_{in}$=sum of $I_B+\alpha_i I_E$
$I_E$=the emitter current of the input transistor 20.

By viewing the electrical equivalent circuit of the overall transistor circuit of FIGURE 1, various circuit parameters may be derived in accordance with well-known practice. For example, the input impedance, $Z_{in}$, looking into the base-emitter terminals B-E is approximately given by the equation:

$$Z_{in} = \frac{2r_e + r_c' + (2-\alpha)r_B'}{1=\alpha+\alpha_i} \text{ ohms}$$

It should be borne in mind that in the circuit of FIGURE 1, the second or feedback transistor serves as a constant current generator. This does not mean that the current being fed back on lead 32 is always the same, but rather that the current level is independent of the voltage between current output terminal 31 and the common terminal of the transistor 21, namely, the collector 33.

In order for the above condition to obtain and such is a fundamental circumstance of the present invention concept, in all of its alternate embodiments, the transistor serving as the constant current generator (in FIGURE 1 it is transistor 21) need be in saturation. That is in order for the constant current feedback to occur and thus effectively control a preceding stage, the common terminal (herein 33) is always internally forward biased.

$\beta_i$ is the characteristic of the feedback transistor which is employed in all cases by having one or more of the emitters coupled (typically directly connected without the interposition of an impedance, though not necessarily so) to a point one junction prior in the circuit to control the current gain of the stage (FIGURE 1, for example) to which it is fed, including itself (FIGURE 36, for example). Thus, in general, these conditions obtain:

(a) The feedback transistor is in saturation;
(b) The output current of the feedback transistor serving as a constant current source is fed back;
(c) The collector to base of the feedback transistor is forward biased; and
(d) One of the emitter electrodes of the feedback transistor serves as its collector (in the sense that it serves as a sink for minority carriers injected into the base region of the feedback transistor).

In the simplest case, as shown in FIGURE 1, the collector 33 is grounded (from an external circuit point of view it serves as the overall emitter of the composite transistor circuit, as previously explained) and the emitter electrode 31 serves as an internal collector for transistor 21 in that electrode 31 collects the injected minority carriers and directs them to the base of transistor 20.

At this point it might be asked what makes the collector electrode the collector electrode and what makes the emitter electrode the emitter electrode of the feedback transistor. The answers may be presented as follows: In the broadest sense, of course, in an NPN transistor case, either of the N regions may serve as the emitter or collector. However, ordinarily the resistivity profile, area, impurity concentration and thicknesses of the two N-type regions are so designed that the current gain, $\beta$, when the transistor is operated in the normal mode, is substantially greater than unity, it typically being in the range from 10 to 100 (although it may even be as high as several hundred). Now with a transistor so designed, with the collector and emitter terminals reversed and all other conditions, including biasing and the like remaining the same, the current gain (termed "inverse $\beta$," and indicated by the reference notation $\beta_i$) is substantially less, and not greater than one half of the normal $\beta$, i.e., $\beta_i \leq 0.5\beta$. Typically the value of $\beta_i$ is in the range from 0.01 to 0.1. In some cases, however, such as when used for switching purposes as will hereinafter be discussed, $\beta_i$ may be as high as unity.

Thus, the collector (in the conventional arrangement) to base is forward biased; i.e., for forward conduction, the collector acts as the emitter and the emitter serves as the collector. Current feedback occurs only when the feedback transistor is saturated in the sense that the collector-base is forward biased to saturation. In this regard, it may be thought that a somewhat analogous situation is present with circuits, such as shown in FIGURES 5 and 6, wherein the collector (viewing FIGURE 6 in particular) is shown to be open circuited.

If we assume that emitter $E_1$ of transistor 60 is grounded and the base 62 is at 0.7 volt and the collector 61 at 0.05 volt; the base to collector of transistor 60 is thus forward biased and the base to emitter is also forward biased. If the emitter 67 is at 1.5 volts, the base to emitter 67 would be said to be reverse biased. Under these conditions of operation, the emitter 65 would inject minority carriers into the base, a portion of which would in turn be collected by collector 61 (this despite the fact that it is floating), thus causing the potential at 61 to fall to a value below that of the base 62. When this occurs, saturation is said to exist, and the carriers at collector are reinjected into the base by the collector 61; a portion of such reinjected carriers will be collected by emitter 67, which in turn feeds them back to the base 23 of transistor 20, thus preventing the transistor 20 from going into deep saturation. Thus it is seen that in this particular instance, even though the collector is floating the feedback transistor is saturated. It is therefore understood that reference to forward biasing of the feedback transistor to saturation, as such language appears in both the specification and in the claims, is in the aforementioned sense and specifically includes the case where the collector is floating.

An exemplary transistor amplifier employing the FIGURE 1 overall circuit is shown in FIGURE 2 with specific values for external resistors 41 and 42 and external capacitor 43 being indicated. It will be recalled that transistor 40 shown in this FIGURE 2 is equivalent to the overall circuit of FIGURE 1. Each of the transistors employed were 2N708 type. With the values indicated for the external resistors and the external capacitor and with the input signal being received from a sine wave signal generator 44, it was found that the overall current gain of the circuit was substantially constant from a low frequency of about 100 kc. (limited by the reactance of the coupling capacitor 43 and the input impedance of the circuit) to 10 mc. The gain (voltage or current) at higher frequencies fell off at the rate of 6 db per octave. This indicates the present invention transistor circuit whereby the input transistor is effectively controlled by feedback from the output transistor (which is a function of $\beta_i$) is applicable for high frequency conditions, as well as for low frequency conditions or down to D.C. conditions.

The operation of the circuit of FIGURE 3 is substantially the same as that of the circuit of FIGURE 1. A second emitter electrode 34 has been included in the output transistor which is therefore designated by a different number 30 from that designated as the output transistor in FIGURE 1. The input transistor is in all respects exactly the same as the input transistor in FIGURE 1 and hence bears the same number. Emitter electrode 38 is connected by lead 39 back to the base electrode 23 of the input transistor 20. The additional emitter electrode included in transistor 30 is merely representative of the fact that one or more emitters may be fabricated in the output or feedback transistor. A further discussion of multiple-emitter transistor may be found in copending U.S. patent application Serial No. 136,841, filed September 8, 1961 by the inventor of the present invention and assigned to the present assignee.

The additional emitter in the output transistor 30 may be used as a current sink for external connection. For example, such a circuit may have application in cascaded amplifier chains. In such an arrangement, the additional emitter electrode or electrodes, such as 34 in this circuit, may serve as an input to a succeeding amplifier stage or it (or they) may be used as a means for feedback to a preceding stage or to the same stage, such as shown in FIGURE 4 hereinafter to be discussed.

Electrically, the equivalent circuit for the circuit of FIGURE 3 varied only from the point of view of the second emitter $E_2$ is shown in FIGURE 3A. Therein the designated current and direction of flow is shown. The expression indicated for the current flow is that of the base current of the output transistor 30. In this circuit:

$C_{BE}$=base to emitter capacitor of emitter 34 of output transistor 30

$G$=constant current generator of value $\beta_i$ times the base current of the output transistor.

The circuit of FIGURE 4 is substantially the same as that of FIGURE 1 except for the addition of a second emitter electrode in the output transistor 30. Each of the output electrodes 34 and 38 provide an inverse feedback path to the base electrode 23 of the input transistor over leads 37 and 39.

This arrangement has the advantage, where it is desired, to alter the overall current gain of the circuit. For example, examination of the current formula discussed in connection with FIGURE 1 hereinabove, it is apparent that the use of two emitters in the output transistor reduces the gain to the value resulting from the substitution of $2\beta_i$ in the formula for $\beta_{ckt.}$ in place of $\beta_i$. Similarly, by the use of more than two emitter electrodes in the output transistor, further flexibility in the overall performance of the circuit may be achieved.

In FIGURE 5 there is shown an output transistor 50 serving as the feedback element to control the current gain of the input transistor 20. The output transistor 50 has a collector electrode 51 which is open circuited or floating. The output transistor further includes two emitter electrodes 53 and 55. The emitter electrode 55 is returned to the base electrode 23 by means of lead 56. The other emitter electrode 53 which is connected to external lead 57 serves as the overall emitter of the transistor circuit. Note that, as in the circuits of FIGURES 1, 3 and 4, the base electrode and the collector electrode of the input transistor 20 serve as the overall base and collector electrodes of the entire circuit as it functions as a single transistor. It is assumed that for this mode of operation, the current gain transfer characteristic from one emitter to the other emitter (be there two or more) is very small, i.e., less than 0.01 so that it may effectively be neglected. A typical construction of a multiple-emitter transistor, such as is described and claimed in the aforementioned copending application, gives a basis for this assumption. In this circuit, with the collector electrode floating, the current gain transfer characteristic from one emitter to another emitter of the multiple emitter output transistor is as follows:

$$\beta_i = \frac{\alpha_n \alpha_i}{1 - \alpha_n \alpha_i}$$

where:

$\alpha_n$ = the current gain ratio of the collector current to the emitter current of the output transistor when the transistor electrodes are employed and biased in the conventional manner, as shown, for example, in an article by Ebers and Moll, entitled "Large-Signal Behavior of Junction Transistor," page 1761 of December 1954 issue of Proceedings of the I.R.E.

$\alpha_i$ = the current gain ratio of the collector current to the emitter current of the output transistor when the transistor electrodes are employed and biased opposite the conventional manner.

The circuit of FIGURE 6 is similar to that of FIGURE 5. Herein the output transistor 60 has its collector electrode 61 floating. Three emitter electrodes 63, 65 and 67 are included in the output transistor, in place of the two emitter electrodes of FIGURE 5. This circuit operates substantially the same as the FIGURE 5 circuit except that the additional emitter 63 connected to terminal $E_2$ may be used for external feedback or monitoring purposes. $E_1$, which is the external connection to emitter electrode 65, and $E_2$ may have different values of $\beta_i$, depending upon construction of the transistor; further $E_1$ and $E_2$ may be interchanged in the above-mentioned functions.

The circuit of FIGURE 7 operates in substantially the same manner as the circuit of FIGURE 5, except that the value of the feedback current $I_x$, may be varied due to the effect of the external impedance Z designated 72. The feedback emitter electrode 79 is connected to the base electrode of the input transistor 20 by lead 78 while the other emitter electrode 76 serves as the overall emitter electrode of the circuit.

In FIGURES 5 and 6 where the collector is floating, it was in the sense that no current or a very much smaller current, say one-tenth as much, flowed into this terminal, than that current conducted in any of the other transistor electrodes of the output transistor. This, however, is not a necessary condition of operation as will hereinafter be explained.

As shown in FIGURE 7, the collector electrode of the output transistor may be connected to an impedance Z, and Z may be composed of any combination of real and reactive impedances. The other termination of Z may be to any of the other terminals of the circuit or internal parts of the circuit or to an external circuit. As one example, assume the impedance Z is a real resistance R and the dotted lead 75 terminates at the terminal E. For this case, it can be shown that the current, $$I_x = \left(\frac{\alpha_i - \alpha_n \alpha_i}{1 - \alpha_n \alpha_i}\right)\left(\frac{KT}{qR} \ln \frac{N_E}{N_C}\right) + \beta_i IB$$

This result is derived from the electrical equivalent circuit for FIGURE 7 shown in FIGURE 7A. Note that the terminal 77 is shown in both FIGURES 7 and 7A as an aid in interrelating the two figures. From the equivalent circuit, the following may be stated:

(1) $\qquad I_B + \alpha_i I_C = I_E + I_y$

Equation 1 merely states that the total current in, $I_x + I_B$, equals the total current out, $I_E + I_y$ (2) $\qquad \alpha_n + I_y = I_C$ Equation 2 shows that the current at terminal 77 must add up to zero in accordance with Kirchoff's law.

(3) $\qquad I_y = \frac{V_{EB} - V_{CB}}{R} = \frac{KT}{qR} \ln \frac{N_E}{N_C}$, where:

$\frac{KT}{q} = 0.026$ volt at 300° kelvin $N_E$ = the average impurity concentration in the emitter region 76 of the transistor 70 (impurity atoms/cm.³).

$N_C$ = the average impurity concentration of the collector region 73 of transistor 70 (impurity atoms/cm.³).

Equation 3 is the result of the application of Ohm's law to the current flowing through resistor R (this is on the assumption that Z is purely resistive). By substituting, in the above three equations and solving for $I_x$, the result is as given above.

Thus, it may be seen that, in accordance with the present invention transistor circuit, the current gain of the input transistor may be controlled by an output transistor coupled thereto by current feedback. The output transistor may employ only one or more of its emitter electrodes (of a multiple-emitter transistor) as the feedback element if the collector electrode is either open circuited or is connected to one external impedance, or the like. In the preferred embodiment, however, as shown in FIGURE 1, for example, the current feedback to control the current gain of the input transistor is achieved by coupling of the emitter electrode of the single emitter output transistor, with the collector electrode thereof serving as the overall emitter electrode of the transistor circuit.

The versatility of the present invention current feedback arrangement to effectively present the electrical equivalent of a single transistor whose current gain may be rendered substantially insensitive to either temperature changes and/or changes in radiation levels is further demonstrated in the circuit of FIGURE 8. In this circuit, there is provided an effective combination of two sets of transistor circuits, such as shown in FIGURE 1, and collectively designated as a single transistor 40 in FIGURE 2. Thus, each of the combinations of each of the transistor pairs or circuits in FIGURE 9 are shown in a dotted box designated by the numeral 40. These two transistor equivalents 40 are interconnected in the so-called Darlington mode as an amplifier whereby the collectors are common at 80, and the effective emitter of the first transistor circuit is connected to the base electrode of the second transistor. Such a circuit employing individual transistors is recognized as prior art, but neither the individual transistors so connected in the total prior art circuit will provide current gain which is insensitive to changes in temperature and/or radiation levels.

In FIGURE 9, there is shown a circuit which is in all respects exactly the same as the circuit of FIGURE 1, except the input transistor 90 is of the PNP type as is the output transistor 91. Note that as in the circuit of FIGURE 1, the emitter electrode 97 of the output transistor 91 acts as the feedback electrode to the base electrode 100 of the input transistor 90 by means of lead 99. Similarly, the emitter electrode 94 of the input transistor is connected to the base electrode 93 of the output transistor by lead 96. The current flows and directions are all shown in the drawing, assuming operation exactly the same manner as described in connection with FIGURE 1, but the biasing of the emitter collector being in the conventional manner for a PNP transistor.

The circuit of FIGURE 9 is merely exemplary of all of the other circuits previously shown and described; that is, in any of them all of the transistors may be replaced by PNP type instead of the NPN types shown.

As has been previously mentioned, the present invention transistor circuit employing current feedback to maintain the current gain of the primary or input transistor with varying temperature and/or radiation levels may also be used to tailor the current gain to detect or control such changes. That is, by choosing an output transistor with a $\beta_i$ of a certain value, the $\beta$ of the overall transistor circuit may be made to begin at a low value when operating at a low temperature, then increase to a high value at some intermediate temperature, after which it may be made to fall again with still higher temperatures.

In FIGURE 12, there is shown a curve 120 of the variation of $\beta$ of a typical transistor, such as 2N708, with an increasing temperature. On the other hand, the overall or effective $\beta$ of the circuit is shown to be substantially insensitive when the same transistor in combination with an output or feedback transistor, is subjected to the same temperature condition; that is, shown in FIGURE 10 by curve 101.

In a similar vein, to show the typical effect upon $\beta$ with increasing radiation levels, there is shown a curve 130 in FIGURE 13. Therein the $\beta$, which is initially approximately 45, may be seen to fall off to approximately 10 at a radiation level of $10^{17}$ electrons/cm.$^2$. This graph represents data derived by subjection of an individual 2N706 transistor to a bombardment of electrons at an energy level of 1 m.e.v. On the other hand, when two such 2N706 transistors were interconnected, as shown in FIGURE 1, the resulting curve 110 was the plot of the overall circuit $\beta$ with the combined interconnected transistors having been subjected to identical radiation. It is true that the initial overall $\beta$ of the circuit is approximately 28, compared with a value of 45 for the individual transistor, yet the percentage decrease in $\beta$ with increasing radiation is readily apparent from an examination and comparison of the curves 110 and 130 to be more favorable for the overall circuit than the individual transistor. In order to achieve a higher initial $\beta$ for the entire circuit therefor, one merely would choose an input transistor whose independent $\beta$ is higher than desired, recognizing that it will fall when connected in the feedback mode as described, but in this latter instance it will remain substantially constant over a substantial predetermined temperature range.

Alternately, or in addition, one would choose an output transistor where $\beta_i$ is smaller than would otherwise be the case.

There has been thus described a transistor circuit which may be made to electrically behave in most respects as a single transistor whose current-gain characteristics may be effectively controlled over a predetermined range in a predetermined manner of variation temperature and radiation levels. Various other modes of operation and interconnection employing this concept, other than those specifically shown by example, may be achieved. For example, the circuit of FIGURE 1 may be operated as an emitter follower instead of as an amplifier. Further, the various currents were shown in their most rudimentary form. Instead of direct coupling between electrodes, various impedance elements may be interposed in the coupling lines.

Further, just as the output in feedback transistors of the overall transistor circuit of FIGURE 1 employed its collector electrode as the overall electrode of the transistor circuit, so may this circuit when employed as a single transistor have its emitter and collector electrodes connected in the inverse manner. In addition, a multiple-collector transistor, as well as a multiple-emitter transistor may be advantageously employed as the feedback element or indeed as the main or input transistor.

In FIGURE 16 there is shown an amplifier 200 whose current gain is to be stabilized by current feedback. Constant-current feedback transistor 210 includes an emitter electrode 211, a collector electrode 212 and a base electrode 213. The output terminal of the amplifier 200 is connected to the base electrode 213 of the transistor 210 by an electrical lead 215, while the emitter electrode 211 is connected by electrical lead 217 to the input terminal of the amplifier 200. The amplifier 200 may be any type of amplifier, including vacuum tube and transistor types. The invention herein resides in the provision of a constant-current signal being fed back over electrical lead 217 by the transistor 210 to stabilize or control the output current of the amplifier 200. Note that the feedback electrode is an emitter. Here again, as previously explained, current feedback occurs when the transistor 210 is in saturation.

The circuit of FIGURE 17 is in all respects the same as that of FIGURE 16, except that the current feedback is directed to another input of the amplifier 200'. Thus there is demonstrated the present invention constant-current feedback approach for use in a differential amplifier 200'.

The partial circuit of FIGURE 18 shows a multiple-emitter transistor 220 with one (222) of three emitter electrodes 221, 222 and 223 being fed back over electrical lead 225. The base electrode 226 is indicated as being coupled to a preceding stage. Finally, the collector electrode 227 is shown to be floating. FIGURE 18 is intended to represent the general case for a circuit approach such as that shown in FIGURE 1. The base electrode 226 may be coupled to the output of any preceding stage, such as an amplifier. The two emitter electrodes 221 and 223 may be coupled to some succeeding or external circuits or may simply be used to sample the current being fed back by the emitter electrode 222.

In FIGURE 19 there is shown a circuit which in all respects is exactly the same as the circuit of FIGURE 18, except for the termination of the collector electrode 227 to an impedance 228 which in turn may be connected to anywhere. Thus, the phantom line 229 is shown extending from the impedance 228.

In FIGURE 20 there is shown a circuit illustrating how two composite common-emitter amplifiers of the type shown in FIGURE 3 may be cascaded, primarily to increase the useful power gain. This may be contrasted with the Darlington circuit arrangement of FIGURE 8 in which the primary goal is coupling two composite constant $\beta$ transistor circuits in order to maximize current gain. The first composite transistor of the circuit in FIGURE 20 includes transistors 230 and 240. The transistor 230 is of the NPN type and includes a base electrode 231, an emitter electrode 232 and a collector electrode 233. The transistor 240 is of the multiple-emitter NPN type and includes a base electrode 241, emitter electrodes 242 and 243, and a collector electrode 244. An electrical lead 234 connects the base electrode 231 of the transistor 230 to a signal input terminal 235. An electrical lead 236 connects the signal input terminal 235 with the emitter electrode 243 of the transistor 240. The collector electrode 233 of the transistor 230 is connected to the positive terminal of a D.C. voltage source, $V_{cc}$, the negative terminal of the voltage supply being grounded. Operating bias for the base electrode 231 is provided by a resistor 237 which couples the base electrode to the positive supply terminal. The emitter electrode 232 of the transistor 230 is connected to the base electrode 241 of the transistor 240. The collector electrode 244 of the transistor 240 is grounded. The output from the transistor 240 is taken from the emitter electrode 242 and fed to the input of the second composite transistor in the circuit.

The circuitry of the second composite transistor in FIGURE 20 is identical to that of the just described first composite transistor in this circuit, primed reference characters being utilized to identify the corresponding individual components. Output from the transistor 240' is taken from its emitter electrode 242', this electrode being coupled to a signal output terminal 245. The biasing resistors 237 and 237' ensure proper signal coupling since the transistor 260 acts as a current sink, current being supplied to the emitter electrode 242 from the D.C. voltage supply through the biasing resistor 237'. Thus, while the Darlington circuit of FIGURE 8 provides a composite transistor, the circuit of FIGURE 20 provides two composite transistors cascaded in an amplifier chain. The cascading of the basic circuits in this manner to form an amplifier chain still provides the advantages of the individual composite transistors, namely, an overall circuit $\beta$ which is relatively insensitive to substantial temperature changes and radiation levels.

In FIGURE 21 of the drawing there is shown an amplifier chain based upon the composite circuitry of FIGURE 3 in which two of the composite transistors are intercoupled by a third composite transistor. Thus a three stage amplifier results, the stages one, two and three being generally indicated by the extent of the brackets in FIGURE 21. The first stage in this amplifier chain consists of a composite transistor including transistors 250 and 260. The transistor 250 is of the NPN type and includes a base electrode 251, an emitter electrode 252 and a collector electrode 253. The transistor 260 is of the multiple-emitter NPN type and includes a base electrode 261, emitter electrodes 262 and 263, and a collector electrode 264. The base electrode 251 of the transistor 250 is connected to a signal input terminal 255. The emitter electrode 252 of the transistor 250 is connected to the base electrode 261 of the transistor 260. The collector electrode 253 of the transistor 250 is connected to the positive terminal of a D.C. voltage supply, $V_{cc}$, the negative terminal of which is grounded. Current feedback is provided by connecting the emitter electrode 263 of the transistor 260 to the base electrode 251 of the transistor 250 by means of an electrical lead 256. The collector electrode 264 is grounded.

The second stage of the amplifier chain of FIGURE 21 is a composite constant $\beta$ transistor utilizing a pair of PNP transistors 270 and 280, these transistors including respective base electrodes 271 and 281, emitter electrodes 272 and 282, and collector electrodes 273 and 283. The base electrode 271 of the transistor 270 is connected to the emitter electrode 262 of the transistor 260 in the first stage. The emitter electrode 272 of the transistor 270 is connected to the base electrode 281 of the transistor 280. Current feedback is provided by interconnection of the emitter electrode 282 of the transistor 280 to the base electrode 271 of the transistor 270. The collector electrode 283 of the transistor 280 is connected to the positive 283 of the transistor 280 is connected to the positive D.C. supply terminal. Output from the second stage is taken from the collector electrode 273 of the transistor 270.

The third stage of this amplifier chain is identical to the first stage, corresponding components being indicated by primed reference numerals. Input to the third stage is obtained by connecting the base electrode 251' of the transistor 250' to the collector electrode 273 of the transistor 270 in the second stage, output from the third stage being obtained by interconnecting the emitter electrode 262' to a signal output terminal 265. The NPN output transistor of the first stage acts as a current sink, current being supplied to the emitter electrode 262 through the PNP transistors of the second stage. The PNP transistors of the second stage function to provide current output (rather than acting as a current sink); hence direct coupling is obtained to the third stage of the amplifier without the necessity of biasing resistors, such as those used in the circuit of FIGURE 20. Thus, in the circuit of FIGURE 21, a three stage directly-coupled amplifier chain is provided, the coupling stage (stage 2) also being characterized by constant $\beta$ and providing additional gain.

In FIGURE 22 of the drawing there is shown an alternative embodiment of a directly coupled three stage amplifier similar to the amplifier chain of FIGURE 21, with the exception of the configuration of the second or coupling stage. Since the first and third stages are identical to those of the circuit of FIGURE 1, identical reference numerals are used.

In stage 2, the coupling stage, a PNP transistor 290 is used in conjunction with a multiple-emitter PNP transistor 300. The transistor 290 includes a base electrode 291, an emitter electrode 292 and a collector electrode 293. The transistor 300 includes a base electrode 301, emitter electrodes 302 and 303, and a collector electrode 304. Input to the second stage is obtained by coupling the base electrode 291 of the transistor 290 to the emitter electrode 262 of the transistor 200 in the first stage. The collector electrode 293 of the transistor 290 is grounded. The emitter electrode 292 of the transistor 290 is connected to the base electrode 301 of the transistor 300. The collector electrode 304 of the transistor 300 is connected to the positive terminal of the supply voltage source. Current feedback is provided by interconnecting the emitter electrode 302 of the transistor 300 to the base electrode 291 of the transistor 290. Output from the second stage is taken from the emitter electrode 303 of the transistor 300 by interconnection of this electrode to the base electrode 251' of the transistor 250' in the third stage. Again, the coupling stage provides current to the output transistor of the first stage while providing a current output to the third stage, thereby enabling direct coupling with additional current gain, as before.

In FIGURE 23 of the drawing there is shown a circuit employing two NPN transistors 310 and 320, arranged to produce an all-pass amplifier. The transistors 310 and 320 include respective base electrodes 311 and 321, emitter electrodes 312 and 322, and collector electrodes 313 and 323. Input to the amplifier is fed to the base electrode 311 of the transistor 310, the emitter electrode 312 of this transistor being connected to the base electrode 321 of the transistor 320. Operating voltage for the circuit is provided from a source of D.C. operating potential through a resistor 315 coupled to the collector electrode 313 of the transistor 310, output of the circuit being taken from the collector electrode 313. The collector electrode 323 of the transistor 320 is grounded, and current feedback is provided by interconnection of the emitter electrode 322 of the transistor 320 to the base electrode 311 of the transistor 310.

The circuit of FIGURE 23 is seen to be of the basic type shown in FIGURE 1 of the drawings. FIGURE 24 of the drawings is a graph showing the current gain of the circuit of FIGURE 23 plotted as a function of frequency. An all-pass characteristic is provided, high frequency rolloff being determined by the $\beta$ characteristics of the individual transistors 310 and 320.

FIGURES 25–27 show three alternate high-pass amplifiers based on the circuitry of FIGURE 23, the desired high-pass characteristics being obtained through the addition of resistance and capacitance elements. Since the circuits of FIGURES 25–27 are based upon the circuit of FIGURE 23, identical reference characters will be utilized throughout. The desired high-pass overall amplifier characteristic is obtained in the circuits of FIGURES 25–27 by providing the output transistor 320 with a low-pass filter characteristic which decreases its inverse $\beta(\beta_i)$ with increasing frequency. FIGURE 28 of the drawing is a graph showing $\beta_{ckt.}$ plotted as a function of frequency. At very low frequencies, where the inverse $\beta$ of the transistor 320 is high, the low overall current gain for the circuit results. Upon increasing frequency, the inverse $\beta$ of the output transistor decreases, thereby increasing the overall circuit $\beta$ to a maximum value in accordance with saturation of the transistor 320, the circuit $\beta$ then dropping off in accordance with the usual high frequency roll-off of the individual transistors.

In the circuit of FIGURE 25, the low-pass filter characteristic for the output transistor 320 is obtained by connection of a capacitor 314 between the base electrode 321 and ground, the low-pass filter being formed by the combination of this capacitor with the input impedance of the transistor 320. In the circuit of FIGURE 26, the low-pass filter is formed by a resistor 316 interconnecting the emitter electrode 312 of the transistor 310 with the base electrode 321 of the transistor 320, in conjunction with a capacitor 317 connected between the base electrode 321 and ground. In the circuit of FIGURE 27, the low-pass filter is provided in the current feedback loop by connection of a capacitor 305 between the emitter electrode 322 and ground, in conjunction with a resistor 306 in series with the feedback loop.

In the graph of FIGURE 28, the lower cutoff frequency is designated by the reference notation $f_1$. In the circuits of FIGURES 26 and 27, a cutoff frequency of $f_1$ is obtained by proper selection of the resistor and capacitor forming the low-pass filter, in accordance with the following relationship:

$$RC = \frac{1}{2\pi f_1} = \frac{1}{\omega_1}$$

where R is the resistance of the resistor and C is the capacitance of the capacitor. In the circuit of FIGURE 25, the value of R will be primarily attributable to the input resistance of the output transistor 320.

In FIGURES 29 and 30 of the drawing there are shown adaptations of the circuit of FIGURE 23 to provide low-pass amplifiers in accordance with the present invention. The desired overall low-pass characteristic is achieved by providing the output transistor 320 with a high-pass filter to increase its inverse $\beta$ with increasing frequency to thereby cause a reduction in $\beta_{ckt.}$ as the frequency is increased above the cutoff frequency of the filter. In the circuit of FIGURE 29, the high-pass filter is achieved by insertion of a parallel R-C network in the current feedback loop, the network consisting of a resistor 307 connected in shunt with a capacitor 308. In the circuit of FIGURE 30, the parallel R-C combination of the resistor 307 and the capacitor 308 intercouples the emitter electrode 312 of the transistor 310 with the base electrode 321 of the transistor 320. FIGURE 31 of the drawing is a graph showing $\beta_{ckt.}$ plotted as a function of frequency for the circuits of FIGURES 29 and 30. In the graph of FIGURE 31, the notation $f_1$ is utilized to denote the cutoff frequency of the high-pass filter formed by the parallel R-C combination, the desired frequency being obtained in accordance with the relationship $RC = 1 \div 2\pi f_1$.

FIGURE 32 is a graph showing $\beta_{ckt.}$ plotted as a function of frequency for a circuit such as shown in FIGURE 23, in which the characteristics of the individual transistors are so chosen as to produce a bandpass amplifier. For example, in the circuit of FIGURE 23, an input transistor 310 is chosen to have a $\beta$ characteristic, $\beta_{310}$, like that shown plotted as a function of frequency in the graph of FIGURE 34. An output transistor 320 is chosen to have the inverse $\beta$ characteristic, $\beta_i$, plotted in the graph of FIGURE 33, this inverse $\beta$ characteristic having a much lower high frequency roll-off than that of $\beta_{310}$. The combination of the $\beta$ of the input transistor 310 and the inverse $\beta$ of the output transistor 320 will give the desired bandpass characteristic plotted in FIGURE 32.

In FIGURE 35 of the drawing, there is shown a diagram illustrating how a multiple-emitter transistor, in accordance with the present invention, may be used in the anti-saturation mode, the transistor being of the NPN type and identified by the reference numeral 330. The transistor 330 includes a base electrode 331, emitter electrodes 332 and 333, and a collector electrode 334. Input to the transistor is applied directly to the base electrode 331. The emitter electrode 333 is connected to the base electrode 331 to apply inverse $\beta$ feedback when the transistor goes into saturation, thereby preventing deep saturation. FIGURE 36 shows a sectional view illustrating how such a transistor may be constructed, identical reference numerals referring to similar electrodes in the schematic diagram of FIGURE 35. Note that in the construction of the transistor the collector 333 and the base 331 are interconnected, thereby eliminating the necessity of an external connection and resulting in a composite three-terminal device.

FIGURES 37, 38 and 40–45 of the drawing are schematic diagrams showing various applications of the present invention circuitry in a multiple-emitter transistorized NAND gate. A NAND gate is a multiple-input logic circuit which is the equivalent of an AND gate with phase inversion. In the circuit of FIGURE 37 there is provided an NPN multiple-emitter transistor 340 including a base electrode 341, emitter electrodes 342, 343 and 344, and a collector electrode 345. The emitter electrodes 342–344 are connected to respective signal input terminals A, B and C. The base electrode 341 is coupled by means of a resistor 346 to a source of D.C. operating potential, $V_{cc}$. The collector electrode 345 is coupled to the base electrode 351 of a multiple-emitter NPN transistor 350. The transistor 350 also includes emitter electrodes 352 and 353, and a collector electrode 354. The emitter electrode 353 is grounded, and the collector electrode 354 is coupled to the signal output terminal $\overline{ABC}$. Current feedback is provided, in accordance with the present invention concept, by intercoupling the emitter electrode 352 of the transistor 350 to the base electrode 341 of the transistor 340 by means of an electrical lead 355.

The circuit of FIGURE 38 shows a similar embodiment with the exception that the emitter electrode 352 is fed back to the collector electrode 345 of the transistor 340 by means of an electrical lead 356, like reference numerals referring to identical components throughout the figures.

In FIGURE 39 of the drawing there is shown a NOR gate circuit in which individual transistors are coupled to the A, B and C inputs. The transistors are of the NPN type and are identified by the reference numerals 360, 370 and 380. The transistors include respective base electrodes 361, 371 and 381, emitter electrodes 362, 372 and 382, and collector electrodes 363, 373 and 383. The base electrodes 361, 371 and 381 are connected to the respective signal input terminals A, B and C. The collector electrodes 363, 373 and 383 are connected to the positive terminal of a D.C. voltage supply, $V_{cc}$, the negative terminal of which is grounded. Biasing resistors 365, 366 and 367 couple the respective base electrodes 361, 371 and 381 to the positive voltage terminal. The emitter electrodes 362, 372 and 382 are connected to the base electrode 391 of a multiple-emitter NPN transistor 390. The transistor 390 also includes four emitter electrodes 392–395, and a collector electrode 396.

The emitter electrode 392 is grounded. Current feedback to the transistor 360 is provided by interconnection of the emitter electrode 393 of the transistor 390 to the base electrode 361 of the transistor 360. Current feedback to the transistor 370 is provided by interconnection of the emitter electrode 394 of the transistor 390 to the base electrode 371 of the transistor 370. Current feedback to the transistor 380 is provided by interconnection of the emitter electrode 395 of the transistor 390 to the base electrode 381 of the transistor 380. The collector electrode 396 of the transistor 390 is coupled to the output terminal, labeled $\overline{A+B+C}$, in accordance with Boolean algebra terminology.

A NOR gate is a multiple input logic circuit which produces an output whenever a triggering signal is impressed on any of its inputs, the polarity of the output signal being opposite to the polarity of the input signal, i.e., a NOR gate is an OR gate with phase inversion. In the particular circuit connection of FIGURE 39 each of the three gate input transistors functions in conjunction with the feedback transistor 390 as a basic constant-$\beta$ circuit of the present invention, as explained hereinabove. For example, an input signal applied to the terminal A will be applied through the transistor 360 to the feedback transistor 390, current feedback through the emitter electrode 393 preventing deep saturation of that transistor. Thus, in this instance, the transistors 360 and 390 combine to function as the basic present invention constant-$\beta$ circuit, a positive input signal resulting in a negative output signal.

In FIGURE 40 of the drawing there is shown a schematic diagram of a low-level NAND gate utilizing diode logic in conjunction with the basic constant-$\beta$ circuit of the present invention. Two transistors are utilized in this embodiment, an NPN transistor 400, and a multiple-emitter NPN transistor 410. The transistor 400 includes a base electrode 401, an emitter electrode 402 and a collector electrode 403, the transistor 410 including a base electrode 411, emitter electrodes 412 and 413, and a collector electrode 414. The diode logic is provided by semiconductor diodes 405, 406 and 407 coupled to the respective signal input terminals A, B and C, in conjunction with a resistor 408. The junction between the diodes and the resistor 408 is connected to the base electrode 401 of the transistor 400, the other end of the resistor 408 being connected to the positive terminal of a D.C. voltage supply, $V_{cc}$. The collector electrode 403 of the transistor 400 is also connected to the positive terminal of the D.C. supply. The emitter electrode 411 of the transistor 410, the negative terminal of the D.C. voltage supply being coupled to this interconnected emitter and base through a resistor 409. The emitter electrode 412 of the transistor 410 is grounded, the collector electrode 414 being coupled to the output terminal $\overline{ABC}$. In the circuit of FIGURE 40, the diode logic is the well-known AND circuit, the constant-$\beta$ circuit of the present invention providing the desired phase inversion to produce a NAND output, as indicated.

FIGURE 41 of the drawing shows a schematic diagram of a high level NAND circuit, again utilizing the diode logic of FIGURE 40. The circuit of FIGURE 41 is similar to that of FIGURE 40 with the exception of the addition of an NPN transistor 420 interposed between the transistors 400 and 410. The transistor 420 includes a base electrode 421, an emitter electrode 422 and a collector electrode 423. The emitter electrode 402 of the transistor 400 is connected to the base electrode 421, the emitter electrode 422 being connected to the base electrode 411 of the transistor 410 and to the resistor 409. The collector electrode 423 is connected to the positive terminal of the D.C. voltage supply.

For purposes of explanation, it will be assumed that a current $I_1$ flows through the biasing resistor 408 and that the base current of the input transistor 400 is $I_2$. The current flowing in various other portions of the circuit, in terms of the current $I_2$, is labeled on the circuit diagram of FIGURE 41, for the case in which the transistors 400 and 420 are of identical current gain, $\beta$. The current flowing into the collector electrode 414 of the output of the transistor 410 is indicated by the reference notation $I_x$, the notation $\beta_i$ indicating the inverse $\beta$ of the output transistor 420.

In FIGURE 42 of the drawing there is shown a schematic diagram of the high level NAND circuit based upon the circuit of FIGURE 27 and including an additional transistor amplifier stage utilizing an NPN transistor 430. The transistor 430 has a base electrode 431, an emitter electrode 432 and a collector electrode 433. The transistor 430 functions as a coupling transistor between the input transistor 340 and the output transistor 350, the base electrode 431 of the transistor 430 being connected to the collector electrode 345 of the transistor 340. The emitter electrode 432 of the transistor 430 is connected to the base electrode 351 of the transistor 350, the base electrode 351 also being connected to the negative terminal of the D.C. supply source, $V_{cc}$, through a resistor 434. The collector electrode 433 of the transistor 430 is connected to the positive terminal of the D.C. supply source. Current feedback is carried from the emitter electrode 352 of the transistor 350 to the base electrode 431 of the coupling transistor 430. Thus, the coupling transistor 430 provides additional gain and a higher output than the circuit of FIGURE 37.

Figure 44:
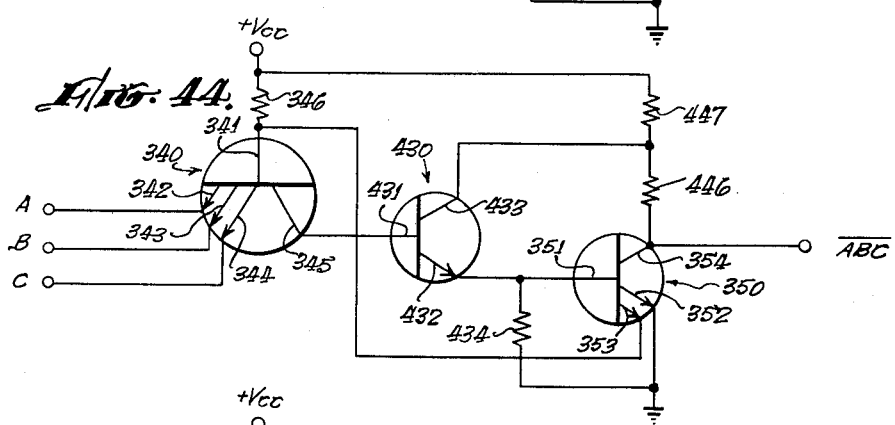
Figure 45:
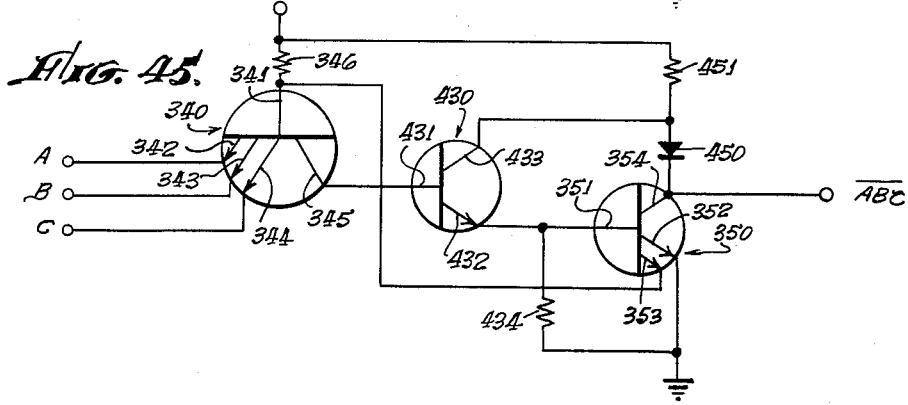

FIGURES 43, 44 and 45 are schematic diagrams of high level NAND gate circuits which are extensions of the circuit of FIGURE 42. In FIGURE 43 the feedback loop is carried from the emitter electrode 353 of the transistor 350 back to the base electrode 341 of the input transistor 340, rather than to the collector electrode 345 as in FIGURE 42. The collector electrode 433 of the coupling transistor 430 is returned to the positive terminal of the D.C. supply through a resistor 436. An NPN transistor 440 is provided with a base electrode 441, an emitter electrode 442 and a collector electrode 443, the base electrode 441 being connected to the collector electrode 433 of the coupling transistor 430. The emitter electrode 442 of the transistor 440 is connected to the collector electrode 354 of the transistor 350. The collector electrode 443 of the transistor 440 is connected to the positive terminal of the D.C. voltage supply $V_{cc}$.

In the circuit of FIGURE 44, the collector electrode 354 of the output transistor 350 is connected to the positive terminal of the D.C. supply through the series combination of resistors 446 and 447. The collector electrode 433 of the coupling rtansistor 430 is connected to the junction between the resistors 446 and 447. Thus, the resistors 446 and 447 form a voltage divider to provide proper bias for the coupling and output transistors.

In the circuit of FIGURE 45, the collector electrode 354 of the output transistor 350 is connected to the positive terminal of the D.C. voltage supply through the series combination of a diode 450 and a resistor 451, the collector electrode 443 of the transistor 440 being connected to the junction between the diode 450 and the resistor 451. The diode 450 provides a collector clamping function which increases the response of the circuit.

Thus there have been described various transistor circuits employing current feedback to accomplish various circuit innovations, the circuitry being based on composite transistor circuitry exhibiting a current gain which is relatively insensitive to changes in temperature and radiation levels. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a transistor circuit, a constant-current generator comprising: a junction transistor having a base electrode, a collector electrode and an emitter electrode, the collector junction of said transistor being forward biased to saturation;
means intercoupling the output of a preceding stage in said circuit to the base electrode of said transistor; and,
means direct-current coupling the emitter electrode of said transistor to said preceding stage to inversely feed back to said preceding stage a current derived from the output current of said preceding stage.

2. In a transistor circuit, a constant-current generator comprising:
a junction transistor having a base electrode, a collector electrode and a plurality of emitter electrodes, the collector junction of said transistor being forward biased to saturation;
means intercoupling the output of a preceding stage in said circuit to the base electrode of said transistor;
means direct-current coupling an emitter electrode of said transistor to said preceding stage to inversely feed back to said preceding stage a current derived from the output current of said preceding stage; and
means coupling an output load impedance to another of said emitter electrodes of said transistor.

3. In a transistor circuit, a constant-current generator comprising:
a junction transistor having a base electrode, a collector electrode and an emitter electrode, the collector junction of said transistor being forward biased to saturation;
means intercoupling the output of a preceding stage in said circuit to the base electrode of said transistor;
means direct-current coupling the emitter electrode of said transistor to said preceding stage to inversely feed back to said preceding stage a current derived from the output current of said preceding stage; and
means coupling an output load impedance to the collector electrode of said transistor.

4. In a transistor circuit, a constant-current generator comprising:
a junction transistor having a base electrode, a collector electrode and two emitter electrodes, the collector junction of said transistor being forward biased to saturation;
means intercoupling the output of a preceding stage in said circuit to the base electrode of said transistor;
means intercoupling one of said emitter electrodes to said preceding stage to inversely feed back to said preceding stage a current derived from the output current of said preceding stage; and
means coupling an output load impedance to at least one of said collector electrodes and the other of said emitter electrodes of said transistor.

5. In a transistor circuit, a constant-current generator comprising:
a junction transistor having a base electrode, a collector electrode and two emitter electrodes, the collector junction of said transistor being forward biased to saturation;
means intercoupling the output of a preceding stage in said circuit to the base electrode of said transistor;
means intercoupling one of the emitter electrodes of said transistor to said preceding stage to inversely feed back to said preceding stage a current derived from the output current of said preceding stage; and
means coupling an output load impedance between the collector and the other emitter electrode of said transistor.

6. A transistor circuit forming a composite electrical translating element having an input electrode, an output electrode and a common electrode, said circuit comprising:
a first junction transistor having a base electrode, a collector and an emitter electrode, the base electrode of said first transistor serving as the input electrode of said composite electrical translating element, the collector electrode of said first transistor serving as the output electrode of said composite electrical translating element; and
a second junction transistor having a base electrode, a collector electrode and an emitter electrode, said second transistor being of the same conductivity type as said first transistor, the base electrode of said second transistor being coupled to the emitter electrode of said first transistor, the emitter electrode of said second transistor being direct current coupled to the base electrode of said first transistor, the collector electrode of said second transistor serving as the common electrode of said composite electrical translating element.

7. A transistor circuit forming a composite electrical translating element having an input electrode, an output electrode and a common electrode, said circuit comprising:
(a) a first junction transistor having a base electrode, a collector electrode and an emitter electrode, the base electrode of said first transistor serving as the input electrode of said composite electrical translating element, the collector electrode of said first transistor serving as the output electrode of said composite electrical translating element; and,
(b) a second junction transistor having a base electrode, a collector electrode and at least one emitter electrode, said second transistor being of the same conductivity as said first transistor, the base electrode of said second transistor being coupled to the emitter electrode of said first transistor, an emitter electrode of said second transistor being coupled to the base electrode of said first transistor, the collector electrode of said second transistor serving as the common electrode of said composite electrical translating element unless said second transistor has more than one emitter electrode, in which case either the collector electrode of said second transistor or one of the other of said emitter electrodes of said second transistor may serve as the common electrode of said composite electrical translating element.

8. A transistor circuit forming a composite electrical translating element having an input electrode, an output electrode and a common electrode, said circuit comprising:
(a) a first junction transistor having a base electrode, a collector electrode and an emitter electrode, the base electrode of said first transistor serving as the input electrode of said composite electrical translating element, the collector electrode of said first transistor serving as the output electrode of said composite electrical translating element; and,
(b) a second junction transistor having a base electrode, a collector electrode and two emitter electrodes, said second transistor being of the same conductivity type as said first transistor, the base electrode of said second transistor being coupled to the emitter electrode of said first transistor, one of the emitter electrodes of said second transistor being coupled to the base electrode of said first transistor, the other emitter electrode of said second transistor effectively floating or being connected to an external impedance, the collector electrode of said second transistor serving as the common electrode of said composite electrical translating element.

9. A transistor circuit forming a composite electrical translating element having an input electrode, an output electrode and a common electrode, said circuit comprising:
(a) a first junction transistor having a base electrode, a collector electrode and an emitter electrode, the base electrode of said first transistor serving as the input electrode of said composite electrical translating element, the collector electrode of said first transistor serving as the output electrode of said composite electrical translating element; and (b) a second junction transistor having a base electrode, a collector electrode and two emitter electrodes, said second transistor being of the same conductivity type as said first transistor, the base electrode of said second transistor being coupled to the emitter electrode of said first transistor, both of the emitter electrodes of said second transistor being coupled to the base electrode of said first transistor, the collector electrode of said second transistor serving as the common electrode of said composite electrical translating element.

10. A transistor circuit forming a composite electrical translating element having an input electrode, an output electrode and a common electrode, said circuit comprising:
(a) a first junction transistor having a base electrode, a collector electrode and an emitter electrode, the base electrode of said first transistor serving as the input electrode of said composite electrical translating element, the collector electrode of said first transistor serving as the output electrode of said composite electrical translating element; and,
(b) a second junction transistor having a base electrode, a collector electrode and two emitter electrodes, said second transistor being of the same conductivity type as said first transistor, the base electrode of said second transistor being coupled to the emitter electrode of said first transistor, the collector electrode of said second transistor effectively floating, one of the emitter electrodes of said second transistor being coupled to the base electrode of said first transistor, the other emitter electrode of said second transistor serving as the common electrode of said composite electrical translating element.

11. A transistor circuit forming a composite, multiple-emitter transistor having a base electrode, a collector electrode and a plurality of emitter electrodes, said circuit comprising:
(a) a first junction transistor having a base electrode, a collector electrode and an emitter electrode, the base electrode of said first transistor serving as the base electrode of said composite multiple-emitter transistor, the collector electrode of said first transistor serving as the collector electrode of said composite multiple-emitter transistor; and,
(b) a second junction transistor having a base electrode, a collector electrode and a plurality of emitter electrodes, said second transistor being of the same conductivity type as said first transistor, the base electrode of said second transistor being coupled to the emitter electrode of said first transistor, the collector electrode of said second transistor effectively floating, one of the emitter electrodes of said second transistor being coupled to the base electrode of said first transistor, one or more of the remaining emitter electrodes of said second transistor serving as the emitter terminals of said composite multiple-emitter transistor.

12. A compound transistor circuit including in combination two of the composite electrical translating elements as defined in claim 6, wherein the first of said two composite electrical translating elements has its common electrode connected to the input electrode of the second of said composite electrical translating elements, the output electrodes of said first and second composite electrical translating elements being interconnected to serve as the output electrode of said compound transistor circuit, the input electrode of said first composite electrical translating element serving as the input electrode of said compound transistor circuit, and the common electrode of said second composite electrical translating element serving as the common electrode of said compound transistor circuit.

13. A transistor circuit forming a composite electrical translating element having an overall current gain which is substantiallly insensitive to changes in temperature over a predetermined range and to changes in radiation over a predetermined range, said composite electrical translating element having an input electrode, an output electrode and a common electrode, said circuit comprising:
(a) a first junction transistor having a base electrode, a collector electrode and an emitter electrode, the base electrode of said first transistor serving as the input electrode of said composite electrical translating element, the collector electrode of said first transistor serving as the output electrode of said composite electrical translating element; and,
(b) a second junction transistor having a base electrode, a collector electrode and an emitter electrode, said second transistor being of the same conductivity type as said first transistor, the base electrode of said second transistor being coupled to the emitter electrode of said first transistor, the emitter electrode of said second transistor being coupled to the base electrode of said first transistor, the collector electrode of said second transistor serving as the common electrode of said composite electrical translating element, the current-gain characteristics of said first and second transistors being in the following relationship:

$$k = \frac{\beta_1}{\beta}$$

where:
$k$ = a constant throughout said predetermined temperature range and said predetermined radiation range
$\beta$ = the current gain of said first transistor (the current-gain ratio of the collector current to the base current of said first transistor)
$\beta_1$ = the current-gain ratio of the emitter current (when operated as a collector) to the base current of said second transistor.

14. The transistor circuit as defined in claim 13, wherein $\beta$ is in the range from about five to several hundred and $\beta_1$ is in the range from about 0.01 to about 0.1.

15. A transistor circuit forming a composite transistor having a base element, a collector element and an emitter element, said circuit comprising:
(a) a first junction transistor having a base electrode, a collector electrode, and an emitter electrode, the base electrode of said first transistor serving as the base element of said composite transistor, the collector electrode of said first transistor serving as the collector element of said composite transistor; and,
(b) a second junction transistor having a base electrode, a collector electrode, and an emitter electrode, said second transistor being of the same conductivity type as said first transistor, the base electrode of said second transistor being coupled to the emitter electrode of said first transistor, the emitter electrode of said second transistor being coupled to the base electrode of said first transistor, the collector electrode of said second transistor serving as the emitter element of said composite transistor.

16. A transistor amplifier circuit characterized by an overall current gain which is relatively constant upon variations in temperature and radiation level comprising, in combination:
(a) a first junction transistor having a base electrode, a collector electrode and an emitter electrode, the base electrode of said first transistor being coupled to a signal input terminal and being resistively coupled to the collector electrode of said first transistor;

(b) a second junction transistor having a base electrode, a collector and two emitter electrodes, said second transistor being of the same conductivity type as said first transistor, the base electrode of said second transistor being coupled to the emitter electrode of said first transistor, one of the emitter electrodes of said second transistor being coupled to the base electrode of said first transistor, said first and second transistors being adapted for the coupling of a source of direct current operating voltage between the collector electrode of said second transistor and the collector electrode of said first transistor;

(c) a third junction transistor having a base electrode, a collector electrode and an emitter electrode, said third transistor being of the same conductivity type as said first transistor, the base electrode of said third transistor being coupled to the other emitter electrode of said second transistor and being resistively coupled to the collector electrode of said third transistor, the collector electrode of said third transistor being coupled to the collector electrode of said first transistor; and, (d) a fourth junction transistor having a base electrode, a collector electrode and two emitter electrodes, the fourth transistor being of the same conductivity type as said first transistor, the base electrode of said fourth transistor being coupled to the emitter electrode of said third transistor, the collector electrode of said fourth transistor being coupled to the collector electrode of said second transistor, one of the emitter electrodes of said fourth transistor being coupled to the base electrode of said third transistor, the other emitter electrode of said fourth transistor being coupled to a signal output terminal.

17. A transistor amplifier circuit characterized by an overall current gain which is relatively constant upon variations in temperature and radiation level comprising, in combination:

(a) a first junction transistor having a base electrode, a collector electrode and an emitter electrode, the base electrode of said first transistor being coupled to a signal input terminal;

(b) a second junction transistor having a base electrode, a collector electrode and two emitter electrodes, said second transistor being of the same conductivity type as said first transistor, the base electrode of said second transistor being coupled to the emitter electrode of said first transistor, one of the emitter electrodes of said second transistor being coupled to the base electrode of said first transistor, said first and second transistors being adapted for the coupling of a source of direct current operating potential between the collector electrodes of said first and second transistors;

(c) a third junction transistor having a base electrode, a collector electrode and an emitter electrode, said third transistor being of the opposite conductivity type from said first transistor, the base electrode of said third transistor being coupled to the other emitter electrode of said second transistor;

(d) a fourth junction transistor having a base electrode, a collector electrode and an emitter electrode, said fourth transistor being of the opposite conductivity type from said first transistor, the base electrode of said fourth transistor being coupled to the emitter electrode of said third transistor, the emitter electrode of said fourth transistor being coupled to the base electrode of said third transistor, the collector electrode of said fourth transistor being coupled to the collector electrode of said first transistor;

(e) a fifth junction transistor having a base electrode, a collector electrode and an emitter electrode, said fifth transistor being of the same conductivity type as said first transistor, the base electrode of said fifth transistor being coupled to the collector electrode of said third transistor, the collector electrode of said fifth transistor being coupled to the collector electrode of said fourth transistor; and, (f) a sixth junction transistor having a base electrode, a collector electrode and two emitter electrodes, said sixth transistor being of the same conductivity type as said first transistor, the base electrode of said sixth transistor being coupled to the emitter electrode of said fifth transistor, the collector electrode of said sixth transistor being coupled to the collector electrode of said second transistor, one of the emitter electrodes of said sixth transistor being coupled to the base electrode of said fifth transistor, the other emitter electrode of said sixth transistor being coupled to a signal output terminal.

18. A transistor amplifier circuit characterized by an overall current gain which is relatively constant upon variations in temperature and radiation level comprising, in combination:

(a) a first junction transistor having a base electrode, a collector electrode and an emitter electrode, the base electrode of said first transistor being coupled to a signal input terminal;

(b) a second junction transistor having a base electrode, a collector electrode and two emitter electrodes, said second transistor being of the same conductivity type as said first transistor, the base electrode of said second transistor being coupled to the emitter electrode of said first transistor, one of the emitter electrodes of said second transistor being coupled to the base electrode of said first transistor, said first and second transistors being adapted for the coupling of a source of direct current operating potential between the collector electrodes of said first and second transistors;

(c) a third junction transistor having a base electrode, a collector electrode and an emitter electrode, said third transistor being of the opposite conductivity type from said first transistor, the base electrode of said third transistor being coupled to the other emitter electrode of said second transistor, the collector electrode of said third transistor being coupled to the collector electrode of said second transistor;

(d) a fourth junction transistor having a base electrode, a collector electrode and two emitter electrodes, said fourth transistor being of the opposite conductivity type from said first transistor, the base electrode of said fourth transistor being coupled to the emitter electrode of said third transistor, the collector electrode of said fourth transistor being coupled to the collector electrode of said first transistor, one of the emitter electrodes of said fourth transistor being coupled to the base electrode of said third transistor;

(e) a fifth junction transistor having a base electrode, a collector electrode and an emitter electrode, said fifth transistor being of the same conductivity type as said first transistor, the base electrode of said fifth transistor being coupled to the other emitter electrode of said fourth transistor, the collector electrode of said fifth transistor being coupled to the collector electrode of said fourth transistor; and, (f) a sixth junction transistor having a base electrode, a collector electrode and two emitter electrodes, said sixth transistor being of the same conductivity type as said first transistor, the base electrode of said sixth transistor being coupled to the emitter electrode of said fifth transistor, the collector electrode of said sixth transistor being coupled to the collector electrode of said second transistor, one of the emitter electrodes of said sixth transistor being coupled to the base electrode of said fifth transistor, the other emitter electrode of said sixth transistor being coupled to a signal output terminal.

19. A high-pass transistor amplifier circuit comprising, in combination:
 (a) a first junction transistor having a base electrode, a collector electrode and an emitter electrode, input signals to said amplifier being applied to the base electrode of said first transistor, output signals from said amplifier being taken from the collector electrode of said first transistor;
 (b) a second junction transistor having a base electrode, a collector electrode and an emitter electrode, said second transistor being of the same conductivity type as said first transistor, the base electrode of said second transistor being coupled to the emitter electrode of said first transistor, the emitter electrode of said second transistor being coupled to the base electrode of said first transistor, said first and second transistors being adapted for the coupling of a source of direct current operating potential between the collector electrodes of said first and second transistors; and,
 (c) capacitance means coupled between the base and collector electrodes of said second transistor.

20. A high-pass transistor amplifier circuit comprising, in combination:
 (a) a first junction transistor having a base electrode, a collector electrode and an emitter electrode, input signals to said amplifier being applied to the base electrode of said first transistor, output signals from said amplifier being taken from the collector electrode of said first transistor;
 (b) a second junction transistor having a base electrode, a collector electrode and an emitter electrode, said second transistor being of the same conductivity type as said first transistor, the emitter electrode of said second transistor being coupled to the base electrode of said first transistor, said first and second transistors being adapted for the coupling of a source of direct current operating potential between the collector electrodes of said first and second transistors;
 (c) resistance means intercoupling the emitter electrode of said first transistor with the base electrode of said second transistor; and,
 (d) capacitance means coupled between the base and collector electrodes of said second transistor.

21. A high-pass transistor amplifier circuit comprising, in combination:
 (a) a first junction transistor having a base electrode, a collector electrode and an emitter electrode, input signals to said amplifier being applied to the base electrode of said first transistor, output signals from said amplifier being taken from the collector electrode of said first transistor;
 (b) a second junction transistor having a base electrode, a collector electrode and an emitter electrode, said second transistor being of the same conductivity type as said first transistor, the base electrode of said second transistor being coupled to the emitter electrode of said first transistor, said first and second transistors being adapted for the coupling of a source of direct current operating potential between the collector electrodes of said first and second transistors;
 (c) capacitance means coupled between the emitter and collector electrodes of said second transistor; and,
 (d) resistance means interconnecting the emitter electrode of said second transistor with the base electrode of said first transistor.

22. A low-pass transistor amplifier circuit comprising, in combination:
 (a) a first junction transistor having a base electrode, a collector electrode and an emitter electrode, input signals to said amplifier being applied to the base electrode of said first transistor, output signals from said amplifier being taken from the collector electrode of said first transistor;
 (b) a second junction transistor having a base electrode, a collector electrode and an emitter electrode, said second transistor being of the same conductivity type as said first transistor, the base electrode of said second transistor being coupled to the emitter electrode of said first transistor, said first and second transistors being adapted for the coupling of a source of direct current operating potential between the collector electrodes of said first and second transistors;
 (c) resistance means interconnecting the emitter electrode of said second transistor with the base electrode of said first transistor; and,
 (d) capacitance means shunting said resistance means.

23. A low-pass transistor amplifier circuit comprising, in combination:
 (a) a first junction transistor having a base electrode, a collector electrode and an emitter electrode, input signals to said amplifier being applied to the base electrode of said first transistor, output signals from said amplifier being taken from the collector electrode of said first transistor;
 (b) a second junction transistor having a base electrode, a collector electrode and an emitter electrode, said second transistor being of the same conductivity type as said first transistor, the emitter electrode of said second transistor being coupled to the base electrode of said first transistor, said first and second transistors being adapted for the coupling of a source of direct current operating potential between the collector electrodes of said first and second transistors;
 (c) resistance means intercoupling the emitter electrode of said first transistor with the base electrode of said second transistor; and,
 (d) capacitance means shunting said resistance means.

24. A transistor NAND gate circuit comprising, in combination:
 (a) a first junction transistor having a base electrode, a collector electrode and a plurality of emitter electrodes, the emitter electrodes of said first transistor serving as the NAND gate input; and,
 (b) a second junction transistor having a base electrode, a collector electrode and two emitter electrodes, said second transistor being of the same conductivity type as said first transistor, the base electrode of said second transistor being coupled to the collector electrode of said first transistor, one of the emitter electrodes of said second transistor being coupled to a base electrode of said first transistor, the collector electrode of said second transistor providing the NAND gate output, said transistors being adapted for the coupling of a source of direct current operating potential between the base electrode of said first transistor and the other emitter electrode of said second transistor.

25. A transistor NAND gate circuit comprising, in combination:
 (a) a first junction transistor having a base electrode, a collector electrode and a plurality of emitter electrodes, the emitter electrodes of said first transistor serving as the NAND gate input; and,
 (b) a second junction transistor having a base electrode, a collector electrode and two emitter electrodes, said second transistor being of the same conductivity type as said first transistor, the base electrode of said second transistor being coupled to the collector electrode of said first transistor, one of the emitter electrodes of said second transistor being coupled to the base electrode of said second transistor, the collector electrode of said second transistor providing the NAND gate output, said transistors being adapted for the coupling of a source of direct current operating potential between the base electrode of said first transistor and the other emitter electrode of said second transistor.

26. A transistor NAND gate circuit comprising, in combination:
(a) a plurality of input junction transistors of the same conductivity type, each input transistor having a base electrode, a collector electrode and an emitter electrode, the collector electrodes of said input transistors being intercoupled, the emitter electrodes of said input transistors being intercoupled, the base electrode of each of said input transistors being resistively coupled to the collector electrode of that transistor, the base electrode of each of said input transistors providing one of the NAND gate inputs; and,
(b) an output junction transistor having a base electrode, a collector electrode and a plurality of emitter electrodes, said output transistor being of the same conductivity type as said input transistors, the base electrode of said output transistor being intercoupled to the emitter electrodes of said input transistors, the collector electrode of said output transistor providing the NAND gate output, said output transistor having a number of emitter electrodes one greater than the number of input transistors, the base electrode of each of said input transistors being coupled to a different one of the emitter electrodes of said output transistor, said transistors being adapted for the coupling of a source of direct current operating potential between the collector electrodes of said input transistor and the remaining emitter electrode of said output transistor.

27. A diode transistor logic circuit comprising, in combination:
(a) a diode NAND gate circuit;
(b) a first junction transistor having a base electrode, a collector electrode and an emitter electrode, the base electrode of said first transistor being coupled to the output of said diode NAND gate circuit and being resistively intercoupled with the collector electrode of that transistor; and,
(c) a second junction transistor having a base electrode, a collector electrode and two emitter electrodes, said second transistor being of the same conductivity type as said first transistor, the base electrode of said second transistor being coupled to the emitter electrode of said first transistor, the collector electrode of said second transistor providing the circuit output, one of the emitter electrodes of said second transistor being coupled to the base electrode of said first transistor, the other emitter electrode of said second transistor providing the circuit common terminal, said transistors being adapted for the coupling of a source of direct current operating potential between the collector electrode of said first transistor and the base electrode of said second transistor.

28. A diode transistor logic circuit comprising, in combination:
(a) a diode NAND gate circuit;
(b) a first junction transistor having a base electrode, a collector electrode and an emitter electrode, the base electrode of said first transistor being coupled to the output of said diode NAND gate circuit and being resistively intercoupled to the collector electrode of that transistor;
(c) a second junction transistor having a base electrode, a collector electrode and an emitter electrode, said second transistor being of the same conductivity type as said first transistor, the base electrode of said second transistor being coupled to the emitter electrode of said first transistor, the collector electrode of said second transistor being coupled to the collector electrode of said first transistor; and,
(d) a third junction transistor having a base electrode, a collector electrode and two emitter electrodes, said third transistor being of the same conductivity type as said first transistor, the base electrode of said third transistor being coupled to the emitter electrode of said second transistor, the collector electrode of said third transistor providing the circuit output, one of the emitter electrodes of said third transistor being coupled to the base electrode of said first transistor, the other emitter electrode of said third transistor providing the circuit common terminal, said transistors being adapted for the coupling of a source of direct current operating potential between the collector electrode of said first transistor and the base electrode of said third transistor.

29. A high-level NAND gate circuit comprising, in combination:
(a) a first junction transistor having a base electrode, a collector electrode and a plurality of emitter electrodes, the emitter electrodes of said first transistor providing the NAND gate inputs;
(b) a second junction transistor having a base electrode a collector electrode and an emitter electrode, said second transistor being of the same conductivity type as said first transistor, the base electrode of said second transistor being coupled to the collector electrode of said first transistor, the collector electrode of said second transistor being resistively intercoupled with the base electrode of said first transistor; and,
(c) a third junction transistor having a base electrode, a collector electrode and two emitter electrodes, said third transistor being of the same conductivity type as said first transistor, the base electrode of said third transistor being coupled to the emitter electrode of said second transistor, the collector electrode of said third transistor providing the NAND gate output, one of the emitter electrodes of said third transistor being coupled to the base electrode of said second transistor, the other emitter electrode of said third transistor providing a circuit common terminal, said transistors being adapted for the coupling of a source of direct current operating potential between the collector electrode of said second transistor and the base electrode of said third transistor.

30. A high-level NAND gate circuit comprising, in combination:
(a) a first junction transistor having a base electrode, a collector electrode and a plurality of emitter electrodes, the emitter electrodes of said first transistor providing the NAND gate inputs;
(b) a second junction transistor having a base electrode, a collector electrode, and an emitter electrode, said second transistor being of the same conductivity type as said first transistor, the base electrode of said second transistor being coupled to the collector electrode of said first transistor;
(c) a third junction transistor having a base electrode, a collector electrode, and two emitter electrodes, said third transistor being of the same conductivity type as said first transistor, the base electrode of said third transistor being coupled to the emitter electrode of said second transistor, the collector electrode of said third transistor providing the NAND gate output, one of the emitter electrodes of said third transistor being coupled to the base electrode of said first transistor, the other emitter electrode of said third transistor being resistively intercoupled to the base electrode of said third transistor; and,
(d) a fourth junction transistor having a base electrode, a collector electrode, and an emitter electrode, said fourth transistor being of the same conductivity type as said first transistor, the base electrode of said fourth transistor being coupled to the collector electrode of said second transistor, the collector electrode of said fourth transistor being resistively intercoupled to the collector electrode of said second transistor and the base electrode of said first transistor, the emitter electrode of said fourth transistor being coupled to the collector electrode of said third transistor, said transistor being adapted for the coupling of a source of direct current operating potential between the collector electrode of said fourth transistor and said other emitter electrode of said third transistor.

31. A high-level NAND gate circuit comprising, in combination:
(a) a first junction transistor having a base electrode, a collector electrode, and a plurality of emitter electrodes, the emitter electrodes of said first transistor providing the NAND gate inputs;
(b) a second junction transistor having a base electrode, a collector electrode and an emitter electrode, said second transistor being of the same conductivity type as said first transistor, the base electrode of said second transistor being coupled to the collector electrode of said first transistor, the collector electrode of said second transistor being resistively coupled to the base electrode of said first transistor; and,
(c) a third junction transistor having a base electrode, a collector electrode and two emitter electrodes, said third transistor being of the same conductivity type as said first transistor, the base electrode of said third transistor being coupled to the emitter electrode of said second transistor, the collector electrode of said third transistor providing the NAND gate output, the collector electrode of said third transistor being resistively coupled to the collector electrode of said second transistor, one of the emitter electrodes of said third transistor being coupled to the base electrode of said first transistor, the other emitter electrode of said third transistor being resistively coupled to the base electrode of that transistor, said transistors being adapted for the coupling of a source of direct current operating potential between said other emitter electrode of said third transistor and said resistive means intercoupling the collector electrode of said second transistor with the base electrode of said first transistor.

32. A high-level NAND gate circuit comprising, in combination:
(a) a first junction transistor having a base electrode, a collector electrode and a plurality of emitter electrodes, the emitter electrodes of said first transistor providing the NAND gate inputs;
(b) a second junction transistor having a base electrode, a collector electrode and an emitter electrode, said second transistor being of the same conductivity type as said first transistor, the base electrode of said second transistor being coupled to the collector electrode of said first transistor, the collector electrode of said second transistor being coupled by resistance means to the base electrode of said first transistor; and,
(c) a third junction transistor having a base electrode, a collector electrode and two emitter electrodes, said third transistor being of the same conductivity type as said first transistor, the base electrode of said third transistor being coupled to the emitter electrode of said second transistor, the collector electrode of said third transistor providing the NAND gate output, the collector electrode of said third transistor being coupled by diode rectifier means to the collector electrode of said second transistor, one of the emitter electrodes of said third transistor being coupled to the base electrode of said first transistor, the other emitter electrode of said third transistor being resistively coupled to the base electrode of that transistor, said transistors being adapted for the coupling of a source of direct current operating potential between said other emitter electrode of said third transistor and the resistance means intercoupling the collector electrode of said second transistor with the base electrode of said first transistor.

33. A transistor circuit forming a composite PNP transistor having a base electrode, a collector electrode and an emitter electrode, said circuit comprising:
(a) a first NPN transistor having a base electrode, a collector electrode and an emitter electrode, the base electrode of said first transistor serving as the base element of said composite PNP transistor, the collector electrode of said first transistor serving as the collector element of said composite PNP transistor; and,
(b) a second NPN transistor having a base electrode, a collector electrode and an emitter electrode, the base electrode of said second transistor being coupled to the emitter electrode of said first transistor, the emitter electrode of said second transistor being direct-current coupled to the base electrode of said first transistor, the collector electrode of said second transistor serving as the emitter element of said composite PNP transistor.

34. A transistor circuit forming a composite NPN transistor having a base electrode, a collector electrode and an emitter electrode, said circuit comprising:
(a) a first PNP transistor having a base electrode, a collector electrode and an emitter electrode, the base electrode of said first transistor serving as the base element of said composite NPN transistor, the collector electrode of said first transistor serving as the collector element of said composite NPN transistor; and,
(b) a second PNP transistor having a base electrode a collector electrode and an emitter electrode, the base electrode of said second transistor being coupled to the emitter electrode of said first transistor, the emitter electrode of said second transistor being direct-current coupled to the base electrode of said first transistor, the collector electrode of said second transistor serving as the emitter element of said composite NPN transistor.

35. In a transistor circuit, a constant-current generator comprising: a junction transistor having a base electrode, a collector electrode and an emitter electrode, the collector junction of said transistor being forward biased to saturation, the emitter junction of said transistor being reverse biased;
means intercoupling the output of a preceding stage in said circuit to the base electrode of said transistor; and,
means intercoupling the emitter electrode of said transistor to said preceding stage to inversely feed back to said preceding stage a current derived from the output current of said preceding stage.

36. A transistor circuit forming a composite electrical translating element having an input electrode, an output electrode and a common electrode, said circuit comprising:
a first junction transistor having a base electrode, a collector electrode and an emitter electrode, the base electrode of said first first transistor serving as the input electrode of said composite electrical translating element, the collector electrode of said first transistor serving as the output electrode of said composite electrical translating element;
a second junction transistor having a base electrode, a collector electrode and an emitter electrode, said second transistor being of the same conductivity type as said first transistor, the base electrode of said second transistor being coupled to the emitter electrode of said first transistor, the emitter electrode of said second transistor being coupled to the base electrode of said first transistor, the collector electrode of said second transistor serving as the common electrode of said composite electrical translating element, whereby the collector electrode of said second transistor will be forward biased and the emitter electrode of said second transistor will be reverse biased.

References Cited by the Examiner

UNITED STATES PATENTS 3,064,205 11/1962 Wagner _____ 330—28
3,075,151 1/1963 Murray _____ 330—28

ARTHUR GAUSS, *Primary Examiner.*